(12) United States Patent
Narang et al.

(10) Patent No.: US 9,635,536 B2
(45) Date of Patent: Apr. 25, 2017

(54) REMOTE ALARM HUSHING

(71) Applicant: Google Inc., Mountain View, CA (US)

(72) Inventors: Smriti Narang, Santa Clara, CA (US); Prashanth Ramachandran, Mountain View, CA (US); Liang-Yun Wang, San Jose, CA (US); Andrew William Stebbins, Mountain View, CA (US); Jay D. Logue, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/183,659

(22) Filed: Jun. 15, 2016

(65) Prior Publication Data
US 2016/0371967 A1 Dec. 22, 2016

Related U.S. Application Data

(63) Continuation of application No. 15/182,489, filed on Jun. 14, 2016.
(Continued)

(51) Int. Cl.
*G08B 21/00* (2006.01)
*H04W 8/00* (2009.01)
(Continued)

(52) U.S. Cl.
CPC ............ *H04W 8/005* (2013.01); *G08B 3/10* (2013.01); *G08B 21/182* (2013.01); *G08B 25/001* (2013.01); *G08B 25/10* (2013.01); *G08B 29/18* (2013.01); *H04L 12/2803* (2013.01); *H04L 12/2809* (2013.01); *H04L 61/1511* (2013.01); *H04W 4/008* (2013.01); *H04W 4/06* (2013.01); *H04W 52/0229* (2013.01);
(Continued)

(58) Field of Classification Search
CPC ............................ G08B 29/18; H04L 12/2803
USPC ......................................................... 340/506
See application file for complete search history.

(56) References Cited

U.S. PATENT DOCUMENTS

| 8,847,772 B2 | 9/2014 | Marks et al. |
| 2004/0214617 A1 | 10/2004 | Kanazawa et al. |

(Continued)

FOREIGN PATENT DOCUMENTS

| WO | 2015-009924 A1 | 1/2015 |

OTHER PUBLICATIONS

Nieminen, et al. IPv6 over Bluetooth Low Energy (IETF Internet-Draft). Jun. 2015.
(Continued)

*Primary Examiner* — Mark Rushing
(74) *Attorney, Agent, or Firm* — Wolfe-SBMC

(57) ABSTRACT

Methods and devices may be used to remotely hushing alarms by receiving an indication of an alarm event occurring at a remote device and presenting a visual indicator of the alarm event including a hush option to alter an audible and/or visual alarm notification of the remote device. A user selection of the hush option is received. In response to receiving the user selection of the hush option, communicating, from the electronic device to the remote device via a point-to-point low power wireless connection between the electronic device and the remote device, a hush request requests that the remote device alter its audible and/or visual alarm notification and causes an adjustment of the visual indicator to reflect a status of the hush request.

20 Claims, 26 Drawing Sheets

Related U.S. Application Data

(60) Provisional application No. 62/180,529, filed on Jun. 16, 2015, provisional application No. 62/180,531, filed on Jun. 6, 2015.

(51) Int. Cl.

| | | |
|---|---|---|
| *H04W 4/00* | (2009.01) | |
| *H04W 80/06* | (2009.01) | |
| *H04L 29/12* | (2006.01) | |
| *G08B 29/18* | (2006.01) | |
| *H04L 12/28* | (2006.01) | |
| *G08B 3/10* | (2006.01) | |
| *G08B 21/18* | (2006.01) | |
| *G08B 25/00* | (2006.01) | |
| *G08B 25/10* | (2006.01) | |
| *H04W 4/06* | (2009.01) | |
| *H04W 52/02* | (2009.01) | |
| *H04W 76/02* | (2009.01) | |
| *H04W 76/06* | (2009.01) | |
| *H04W 84/12* | (2009.01) | |
| *H04W 84/18* | (2009.01) | |

(52) U.S. Cl.
 CPC ......... *H04W 76/02* (2013.01); *H04W 76/023* (2013.01); *H04W 76/068* (2013.01); *H04W 80/06* (2013.01); *H04L 2012/2841* (2013.01); *H04W 84/12* (2013.01); *H04W 84/18* (2013.01)

(56) References Cited

U.S. PATENT DOCUMENTS

| | | | | |
|---|---|---|---|---|
| 2006/0082455 A1* | 4/2006 | Andres | ............... | G08B 7/06 340/539.1 |
| 2007/0080819 A1* | 4/2007 | Marks | ............... | G08B 17/10 340/628 |
| 2013/0278397 A1 | 10/2013 | Liu et al. | | |
| 2014/0088794 A1* | 3/2014 | Yashiro | ............... | G08C 17/02 701/2 |
| 2014/0249681 A1 | 9/2014 | Yamaguchi et al. | | |
| 2015/0022367 A1* | 1/2015 | Matsuoka | ............... | G08B 25/002 340/692 |
| 2015/0100167 A1 | 4/2015 | Sloo et al. | | |
| 2016/0371961 A1 | 12/2016 | Narang et al. | | |
| 2016/0373917 A1 | 12/2016 | Logue et al. | | |
| 2016/0374120 A1 | 12/2016 | Logue et al. | | |
| 2016/0374133 A1 | 12/2016 | Logue et al. | | |

OTHER PUBLICATIONS

Wikipedia contributors. Bluetooth Low Energy. Wikipedia: The Free Encyclopedia. Wikimedia Foundation, Inc. Accessed Jul. 10, 2015.

DA14580 Datasheet. Revision 3.0, Dialog Semiconductor, plc. Jan. 29, 2015.

Issue 58381: Android 43: Bluetooth LE pretty unstable. Android Open Source Project Issue Tracker. Google Inc. Accessed Jul. 22, 2015.

Core Bluetooth Programming Guide. Apple Inc. Updated Sep. 18, 2013. Accessed Jul. 14, 2015.

BlueZ Supported Profiles. Bluez Project. Accessed Aug. 4, 2015.

Logical Link Control and Adaptation (L2CAP) Architecture. Bluetooth SIG, Inc. Accessed Jul. 13, 2015.

Technical Considerations Bluetooth Technology. Bluetooth SIG, Inc. Accessed Jul. 13, 2015.

16-bit UUID for Members. Bluetooth SIG, Inc. Accessed Jul. 22, 2015.

Bluetooth Specification Version 42. Bluetooth SIG, Inc. Published Dec. 2, 2014.

International Search Report & Written Opinion for PCT Application No. PCT/US2016/037676 dated Sep. 20, 2016; 12 pgs.

\* cited by examiner

REMOTE ALARM HUSHING

CROSS-REFERENCE TO RELATED APPLICATIONS

This application is a continuation of U.S. patent application Ser. No. 15/182,489, filed on Jun. 14, 2016, entitled "REMOTE ALARM HUSHING", which claims priority from and the benefit of Provisional Application Ser. No. 62/180,529, filed Jun. 16, 2015, entitled "DEVICE PAIRING" and Provisional Application Serial No. 62/180,531, filed Jun. 16, 2015, entitled "REMOTE ALARM HUSHING," which are both incorporated by reference herein in their entireties.

BACKGROUND OF THE DISCLOSURE

This disclosure relates to systems, devices, methods, and related computer program products for smart buildings including the smart home. More particularly, this patent specification relates to smart device communications using relatively low energy communication types.

Some homes today are equipped with smart home networks to provide automated control of devices, appliances and systems, such as heating, ventilation, and air conditioning ("HVAC") systems, lighting systems, alarm systems, and home theater and entertainment systems. In some scenarios, one or more devices may have power constraints, network limitations, or constraints on available communication types. Thus, some devices with power constraints or other limitations (e.g., available communication types) may be constrained to use relatively low power networks or communication types. However, these relatively low power connections may have constraints (e.g., unidirectional communication) that interfere with complete connectivity between the devices. Furthermore, other devices that are to connect to the one or more devices may only have hardware (e.g., radios) to communicate using a select (e.g., 802.15) communication type.

Moreover, some of these devices may include hazard detectors that alarm. In some scenarios, these hazard detectors may alarm when critical events are detected. To hush these alarms, physical contact with the alarming device is often required, but such contact may be difficult when the placement of the device is beyond typical user reach.

BRIEF SUMMARY OF THE DISCLOSURE

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure provide methods and systems for enabling devices to communicate secure messages in a first format over a relatively low power communication method, such as a BlueTooth Low Energy (BLE) connection. Through the relatively low power connection, a hazard detector may indicate an alarm to a remote device. In response and through the low power connection, the remote device may hush the alarm. For example, a wireless signal through the low power connection may cause an audible and/or visual signal from a hazard detector (e.g., smoke alarm) to be suppressed.

BRIEF DESCRIPTION OF THE DRAWINGS

Various aspects of this disclosure may be better understood upon reading the following detailed description and upon reference to the drawings in which.

DETAILED DESCRIPTION OF THE DISCLOSURE

Figure 1:
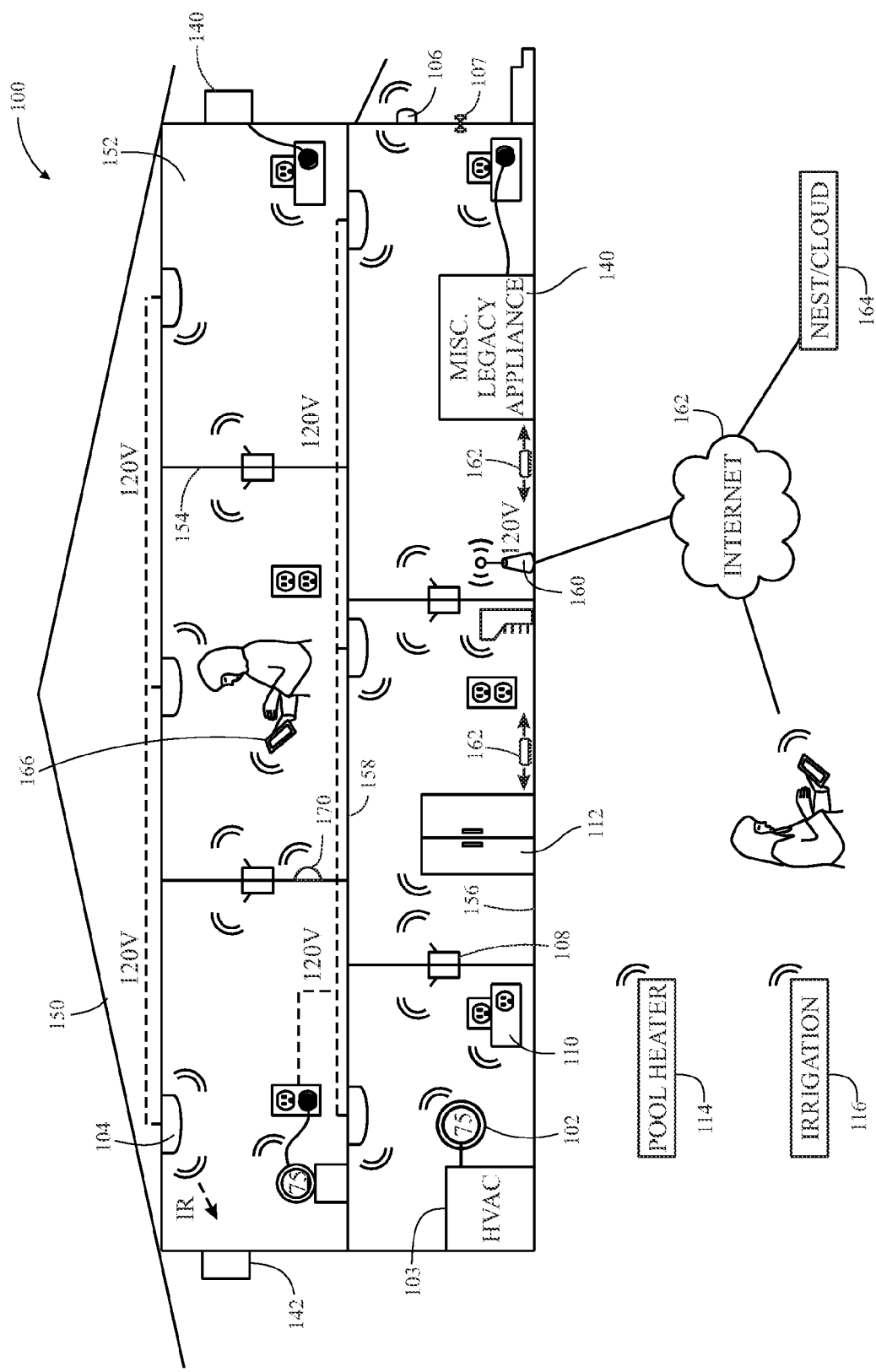
FIG. 1 illustrates an embodiment of a smart-home environment within which one or more of the devices, methods, systems, services, and/or computer program products described herein may be used, according to an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate generally to sending relatively sophisticated application layer messages via BLE and using such communications to remotely For example, a wireless signal through BLE may cause an audible and/or visual signal from a hazard detector (e.g., smoke alarm) to be suppressed alarms in a smart network. It should be appreciated that "smart home environments" may refer to smart environments or smart networks for any building type, such as single-family houses, duplexes, townhomes, multi-unit apartment buildings, hotels, retail stores, office buildings, industrial buildings, and any building that may include one or more smart devices.

It is to be further appreciated that while the terms user, customer, installer, homeowner, occupant, guest, tenant, landlord, repair person, user, and similar terms may be used to refer to a person or persons interacting with a smart device within the network via a user interface, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the units, and is also one of the users of the units. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the embodiments—for example, the password-protected network commissioning functionality described herein may be particularly advantageous where the landlord holds the sole password and can control network additions—such identity should not be construed in the descriptions that follow as necessarily limiting the scope of the present teachings to those particular individuals having those particular identities.

I. Smart Network

With the foregoing in mind, FIG. 1 illustrates an example of a smart-home environment 100, also referred to as a smart network, within which one or more of the devices, methods, systems, services, and/or computer program products described further herein can be applicable. The depicted smart-home environment 100 includes a structure 150, which can include, e.g., a house, office building, garage, or mobile home. In some embodiments, the devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes multiple rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes various devices, including intelligent, multi-sensing, network-connected devices that may integrate seamlessly with each other, with a central server, with a cloud-computing system, or some combination of these to provide any of a variety of useful smart-home objectives. The smart-home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected doorbell devices 106 (hereinafter referred to as "smart doorbells 106"), one or more intelligent, network-connected door locks 107 (hereinafter referred to as "smart door locks 107"), or other device that may interconnect using wired or wireless interfaces.

According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupants go and come). The smart door locks 107 may detect and toggle between a locked and unlocked condition for doors in the home, detect a person's approach to or departure from a respective door, detect whether a door is open or closed, or other suitable controls associated with a smart door lock.

In some embodiments, the smart-home environment 100 of FIG. 1 further includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Further, in some embodiments, the smart-home environment 100 of FIG. 1 includes multiple intelligent, multi-sensing, network-connected appliances 112 (hereinafter referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, window sensors, security systems, and so forth. According to embodiments, the network-connected appliances 112 may be made compatible with the smart-home environment by cooperating with the respective manufacturers of the appliances. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart door lock 107, the smart wall switches 108, the smart wall plugs 110, and other devices of the smart-home environment 100 may be modular and may be incorporated into older and new houses. For example, in some embodiments, the devices are designed around a modular platform consisting of two basic components: a head unit and a back plate, also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There are also many different versions for the head units, such as low-cost versions with few features, and then a progression of increasingly-capable versions, up to and including sophisticated head units with a large number of features. Thus, it should be appreciated that the various versions of the head units may be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room," "kitchen," and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information then may be used to obtain data helpful for determining optimal times for watering. Such data may include sun location information, temperature, dew point, soil type of the land on which the home is located, etc.

By virtue of network connectivity, one or more of the smart-home devices of FIG. 1 can also enable a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some embodiments, the device 166 may be connected to the smart network directly or through additional networks (e.g., WiFi) that are connected to the smart network using one or more devices (e.g., an edge router). In some examples, some or all of the occupants (e.g., individuals who live in the home) can register their device 166 with the smart-home environment 100. Such registration can be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart-home environment 100 may make inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. For example, a smart-home environment may receive communication from a mobile device of an individual who is known to be or who is registered as a guest or determined to be on a common network (e.g., SSID WiFi network) as the smart devices.

In some embodiments, in addition to containing processing and sensing capabilities, each of the devices 102, 104, 106, 107, 108, 110, 112, 114, 116, 162, 170 and other smart devices (collectively referred to as "the smart devices") may be capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.).

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For some embodiments, a user may be able to contact customer support using a device itself rather than needing to use other communication means such as a telephone or Internet-connected computer. Further, software updates can be automatically sent from the central server or cloud-computing system 164 to the smart devices (e.g., when available, when purchased, or at routine intervals).

As discussed below, the smart devices may be combined to create a mesh network. In some embodiments, this mesh network may include spokesman and low-power nodes in the smart-home environment 100, where some of the smart devices are "spokesman" nodes and others are "low-powered" nodes. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and may communicate using wireless protocols that requires very little power, such as ZigBee, 6LoWPAN, etc. Furthermore, some low-power nodes may also have a relatively low amount of memory to reduce power consumption. Thus, in some embodiments, these low-power nodes utilize streamlined messages and data formats of data (e.g., certificates). Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes. Additionally or alternatively, these low-power nodes may intermittently enter into low-power states that causes the low-power devices to operate using relatively lower power than a normal state of operation. Furthermore, in some of these embodiments, the low-power devices may not receive messages during the low-power states. In such embodiments, other nodes may hold messages intended for the relatively-low power nodes during these low-power states to broadcast to the respective low-power node when the low-power node exits the low-power state.

As described herein, the smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening". Accordingly, users, other devices, and the central server or cloud-computing system 164 can communicate controls to the low-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to some embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of low-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 107, 108, 110, 112, and 170) may function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 107, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency or an emergency drill. In some instances, to facilitate this, users provide pre-configuration information that indicates exit routes in the smart-home environment 100. For example, for each room in the house, the user may provide a map of the best exit route depending on availability of the route. In some situations the route may be blocked by a hazard, and an alternate route may be illuminated and indicated, if available. It should be appreciated that instead of a user providing this information, the central server or cloud-computing system 164 or some other device could automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Also included and illustrated in the smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, cellular phone RFID, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, ZigBee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to some embodiments is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such an embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to some embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of multiple known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard. Furthermore, as discussed below, sonic or visual sensing may be used to verify that a user is within predetermined range (e.g., range of sonic or visual detection) of the smart device detecting the sonic or visual stimulus.

For some embodiments, which are particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the device that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gait, patterns of movement, voice, height, size, etc. It should be appreciated that facial recognition may also be used.

According to an embodiment, the wake times associated with the "smart alarm clock" are used by the smart thermostat 102 to control the HVAC in an efficient manner so as to pre-heat or cool the house to the occupant's desired "sleeping" and "awake" temperature settings. The preferred settings can be learned over time, such as by observing which temperature the occupant sets the thermostat to before going to sleep and which temperature the occupant sets the thermostat to upon waking up.

According to an embodiment, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices located throughout the smart-home environment in combination with rules-based inference engines or artificial intelligence provided at the central server or cloud-computing system 164 are used to detect or monitor the progress of Alzheimer's disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
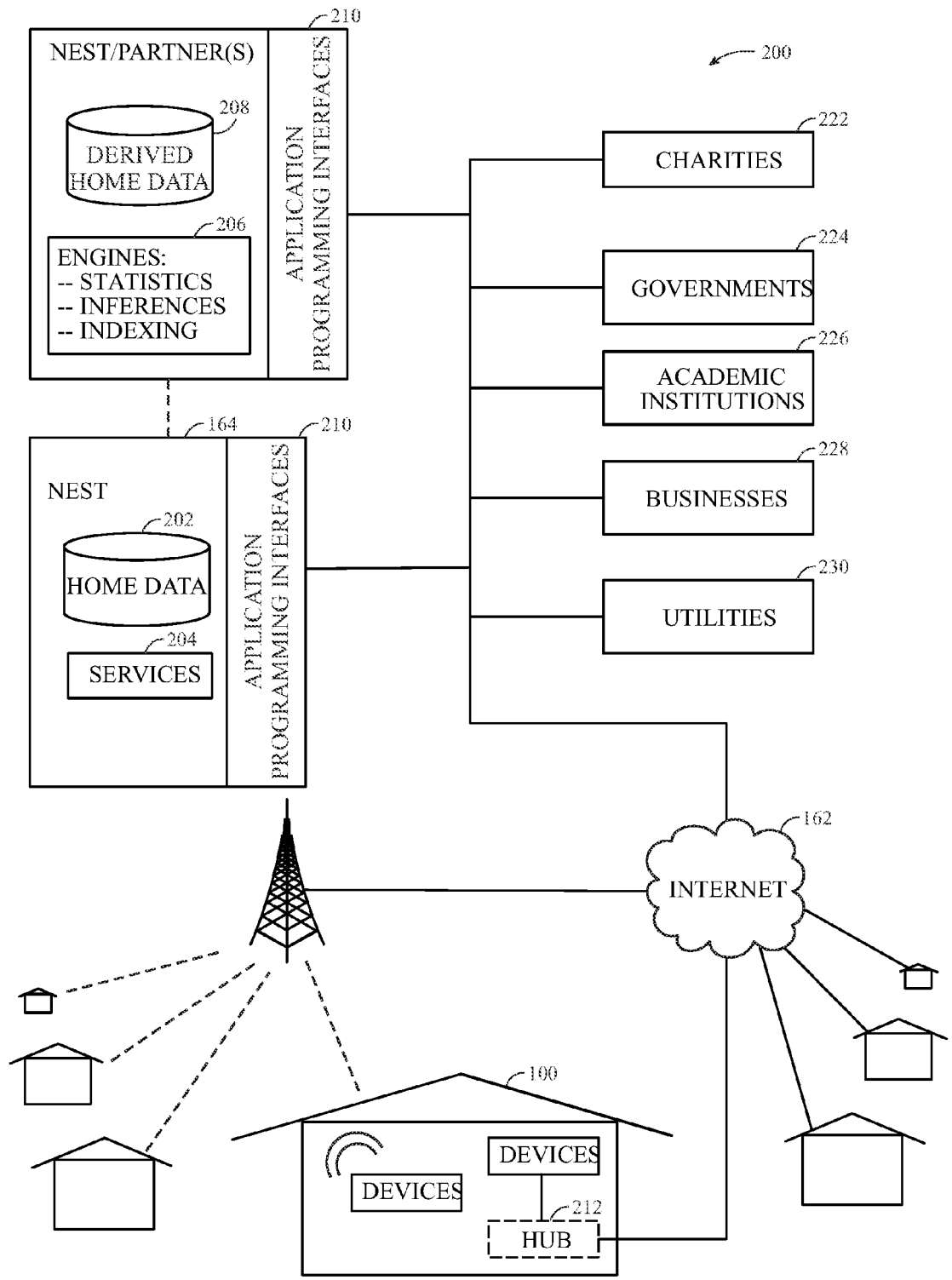
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which multiple smart-home environments, such as the smart-home environment 100 of FIG. 1, can be integrated. The extensible devices and services platform 200 includes remote servers or cloud computing architectures 164. Each of the smart devices can communicate with the remote servers or cloud computing architectures 164. For example, a connection to the Internet 162 can be established either directly (for example, using 3G/4G connectivity to a wireless carrier), through a wireless mesh network (which can be a scheme ranging from a simple wireless router, for example, up to and including an intelligent, dedicated whole-home control node), or through any combination thereof. The smart network may couple to the Internet 162 using a hub 212.

Although in some examples provided herein, the devices and services platform 200 communicates with and collects data from the smart devices of smart-home environment 100 of FIG. 1, it should be appreciated that the devices and services platform 200 may communicate with and collect data from multiple smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 may routinely collect data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, weather information, account information, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving a request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices located in those homes. Additionally or alternatively, if a neighbor's hazard detector detects smoke, neighboring houses may activate irrigation systems to reduce likelihood of a spread of fire. It should be appreciated that this safety network can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirms that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 200 expose a range of application programming interfaces (APIs) 210 to third parties, such as charities 222, governmental entities 224 (e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and other third parties. The APIs 210 may be coupled to and permit third-party systems to communicate with the central server or the cloud-computing system 164, including the services 204, the processing engine 206, the home data 202, and the derived home data 208. For example, APIs 210 may allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 3:
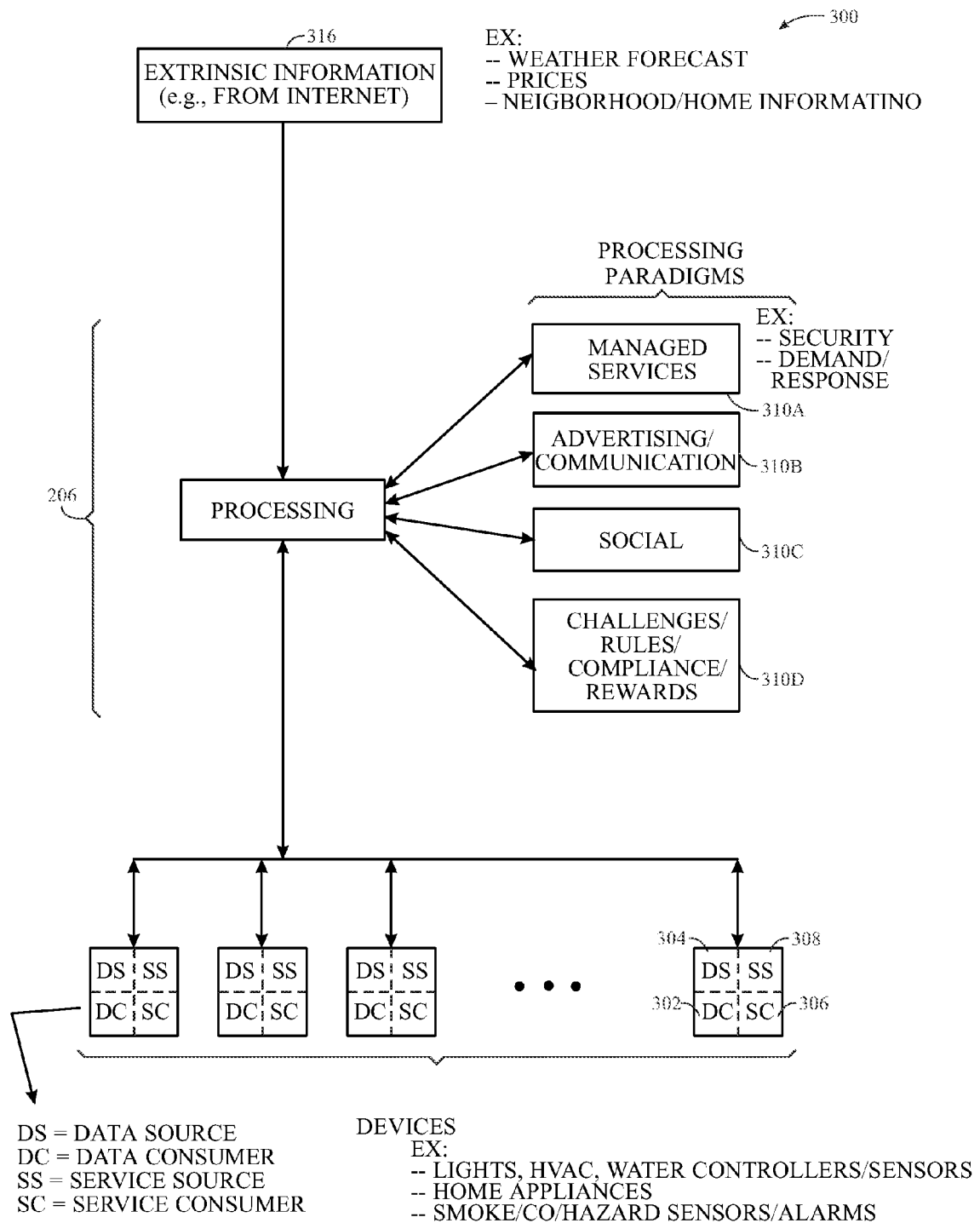
FIG. 3 illustrates a functional view of the extensible devices and services platform of FIG. 2, with reference to a processing engine as well as devices of the smart-home environment, according to an embodiment.

FIG. 3 illustrates a functional view 300 of the extensible devices and services platform 200 of FIG. 2, with particular reference to the processing engine 206 as well as devices, such as those of the smart-home environment 100 of FIG. 1. Even though devices situated in smart-home environments may have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, to conduct safety drills, etc. For example, one challenge may involve participants turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 may integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits may be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

II. Smart Devices

Figure 4:
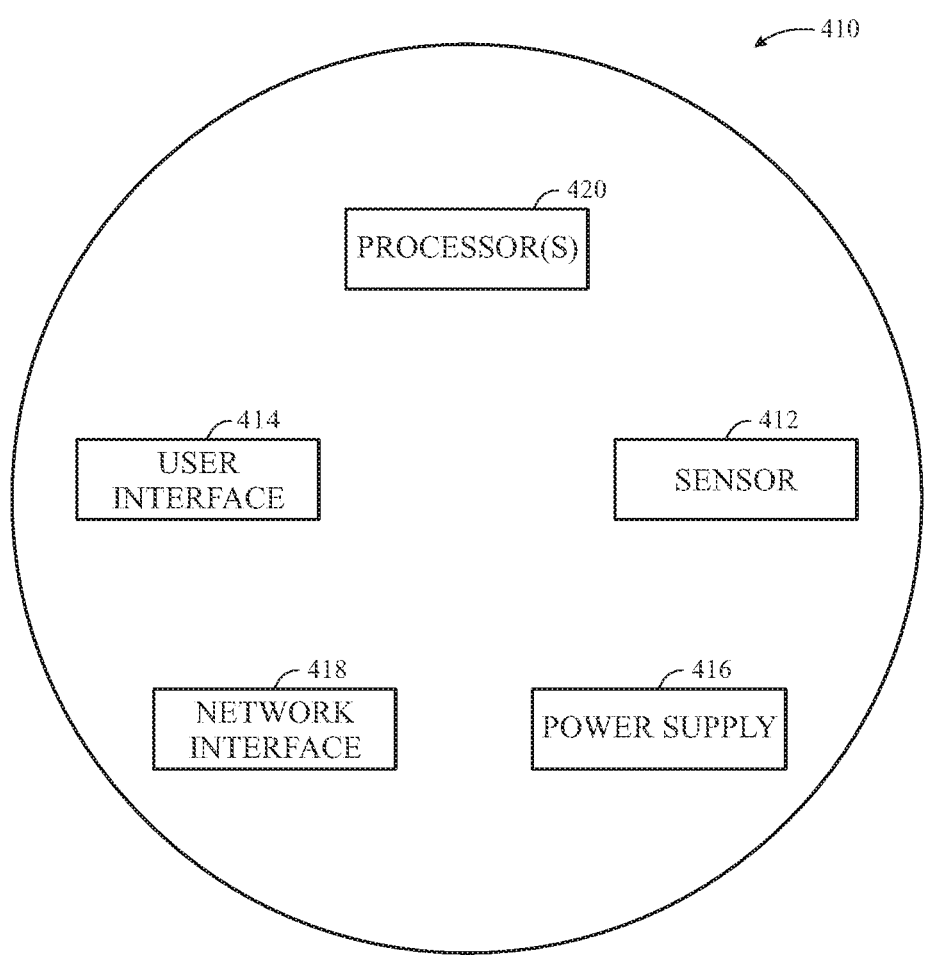
FIG. 4 illustrates block diagram view of a smart device that may securely communicate with other smart devices within the smart-home environment, according to an embodiment.

By way of introduction, FIG. 4 illustrates an example of a device 410 (e.g., thermostat and/or hazard detector) that may that may communicate with other like devices within a home environment. In some embodiments, the device 410 may include one or more sensors 412, a user interface component 414, a power supply 416 (e.g., including a line power connection and/or battery), a network interface 418, a processor 420, and the like. Particular sensors 412, user interface components 414, and power-supply configurations may be the same or similar within each device 410. However, it should be noted that in some embodiments, each device 410 may include particular sensors 412, user interface components 414, power-supply configurations, and the like based on a device type or model.

The sensors 412, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals, or fields, or the like. As such, the sensors 412 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s), radiofrequency identification detector(s) and/or other suitable sensors. While FIG. 4 illustrates an embodiment with a single sensor, many embodiments may include multiple sensors. In some instances, the device 410 may includes one or more primary sensors and one or more secondary sensors. Here, the primary sensor(s) may sense data central to the core operation of the device (e.g., sensing a temperature in a thermostat or sensing smoke in a smoke detector), while the secondary sensor(s) may sense other types of data (e.g., motion, light or sound), which can be used for energy-efficiency objectives, security objectives, safety objectives, and/or smart-operation objectives.

One or more user interface components 414 in the device 410 may receive input from the user and/or present information to the user. The received input may be used to determine one or more settings. In certain embodiments, the user interface components may include a mechanical or virtual component that responds to the user's motion. For example, the user may mechanically move a sliding component (e.g., along a vertical or horizontal track) or rotate a rotatable ring (e.g., along a circular track), or move an object (e.g., finger) across/onto a touchpad of the device 410. Such motions may correspond to a setting adjustment, which can be determined based on an absolute position of a user interface component 414 or based on a displacement of a user interface components 414 (e.g., adjusting a set point temperature by 1 degree F. for every 10° rotation of a rotatable-ring component). Physically and virtually movable user interface components can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user interface component may be associated with a magnitude of a setting adjustment, such that a user may dramatically alter a setting with a large movement or finely tune a setting with s small movement.

The user interface components 414 may also include one or more buttons (e.g., up and down buttons), a keypad, a number pad, a switch, a microphone, and/or a camera (e.g., to detect gestures). In some embodiments, the user interface component 414 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user interface component 414 may include a camera that may detect gestures (e.g., to indicate that a power or alarm state of a device is to be changed). In some instances, the device 410 may have one primary input component, which may be used to set a plurality of types of settings. The user interface components 414 may also be configured to present information to a user via, e.g., a visual display (e.g., a thin-film-transistor display or organic light-emitting-diode display) and/or an audio speaker.

The power-supply component 416 may include a power connection and/or a local battery. For example, the power connection may connect the device 410 to a power source such as a line voltage source. In some instances, an AC power source can be used to repeatedly charge a (e.g., rechargeable) local battery, such that the battery may be used later to supply power to the device 410 when the AC power source is not available.

The network interface 418 may include a component that enables the device 410 to communicate between devices. The network interface may include multiple network connection interfaces. In other words, the network interface 418 may include radios and/or antennas that enable to the network interface 418 to couple the device 410 to multiple networks and/or different devices using different communication methods concurrently. For example, in some embodiments, the network interface 418 may include at least one 802.15.4 radio, at least one WiFi radio, at least one Bluetooth radio, and/or other radios that enable the device to connect to multiple devices and/or networks, concurrently. In some embodiments, the network interface 418 may communicate using an efficient network layer as part of its Open Systems Interconnection (OSI) model. In one embodiment, the efficient network layer, which will be described in more detail below with reference to FIG. 5, may enable the device 410 to wirelessly communicate IPv6-type data or traffic using a RIPng routing mechanism and a DTLS security scheme. As such, the network interface 418 may include one or more wireless cards or some other transceiver connections.

The processor 420 may support one or more of a variety of different device functionalities. As such, the processor 420 may include one or more processors configured and programmed to carry out and/or cause to be carried out one or more of the functionalities described herein. In one embodiment, the processor 420 may include general-purpose processors carrying out computer code stored in local memory (e.g., flash memory, hard drive, and random access memory), special-purpose processors or application-specific integrated circuits, combinations thereof, and/or using other types of hardware/firmware/software processing platforms. Further, the processor 420 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 420 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 420 may include image recognition technology to identify particular occupants or objects.

In certain embodiments, the processor 420 may also include a high-power processor and a low-power processor. The high-power processor may execute computational intensive operations such as operating the user interface component 414 and the like. The low-power processor, on the other hand, may manage less complex processes such as detecting a hazard or temperature from the sensor 412. In one embodiment, the low-power processor may wake or initialize the high-power processor for computationally intensive processes.

In some instances, the processor 420 may predict desirable settings and/or implement those settings. For example, based on the presence detection, the processor 420 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 420 may initiate an audio or visual indicator of where the person, animal or object is or may initiate audio or visual indicator as an alarm or security feature if an unrecognized person is detected under certain conditions (e.g., at night or when lights are off).

In some instances, devices may interact with each other such that events detected by a first device influences actions of a second device. For example, a first device can detect that a smoke has been detected in a garage (e.g., by detecting smoke in the garage, detecting a change in light in the garage, and/or detecting heat in the garage). The first device can transmit this information to a second device via the efficient network layer, such that the second device can perform actions appropriate to the transmitted information, (e.g., adjust a home temperature setting, a light setting, a music setting, and/or a security-alarm setting). As another example, a first device can detect a user approaching a front door (e.g., by detecting motion or sudden light pattern changes). The first device may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 410 may include a thermostat such as a Nest® Learning Thermostat. Here, the thermostat may include sensors 412 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user interface component 414. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off light switches or other electronic devices when it determines that the building is vacant. As such, the thermostat may use the network interface 418 to communicate with a light switch device such that it may send a signal to the light switch device when the building is determined to be vacant. In this manner, the thermostat may efficiently manage the energy use of the building.

Figure 5:
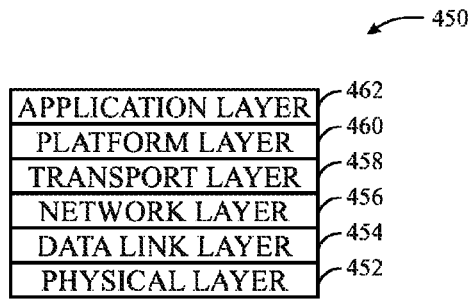
FIG. 5 illustrates a model view that illustrates functions of a communication system in layers including an application layer, a transport layer, and a network layer, according to an embodiment.

Generally, the smart network may be part of an Open Systems Interconnection (OSI) model 450 as depicted in FIG. 5. The OSI model 450 illustrates functions of a communication system with respect to abstraction layers. That is, the OSI model may specify a networking framework or how communications between devices may be implemented. In one embodiment, the OSI model 450 may include six layers: a physical layer 452, a data link layer 454, a network layer 456, a transport layer 458, a platform layer 460, and an application layer 462. Generally, each layer in the OSI model 450 may serve the layer above it and may be served by the layer below it.

Keeping this in mind, the physical layer 452 may provide hardware specifications for devices that may communicate with each other. As such, the physical layer 452 may establish how devices may connect to each other, assist in managing how communication resources may be shared between devices, and the like.

The data link layer 454 may specify how data may be transferred between devices. Generally, the data link layer 454 may provide a way in which data blocks being transmitted may be encoded and decoded into bits as part of a transmission protocol.

The network layer 456 may specify how the data being transferred to a destination node is routed. The network layer 456 may also interface with a security protocol in the application layer 462 to ensure that the integrity of the data being transferred is maintained.

The transport layer 458 may specify a transparent transfer of the data from a source node to a destination node. The transport layer 458 may also control how the transparent transfer of the data remains reliable. As such, the transport layer 458 may be used to verify that data blocks intended to transfer to the destination node indeed reached the destination node. Example protocols that may be employed in the transport layer 458 may include Transmission Control Protocol (TCP) and User Datagram Protocol (UDP).

The platform layer 460 may establish connections between devices according to the protocol specified within the transport layer 458. The platform layer 460 may also translate the data blocks into a form that the application layer 462 may use. The application layer 462 may support a software application that may directly interface with the user. As such, the application layer 462 may implement protocols defined by the software application. For example, the software application may provide serves such as file transfers, electronic mail, and the like.

Figure 6:
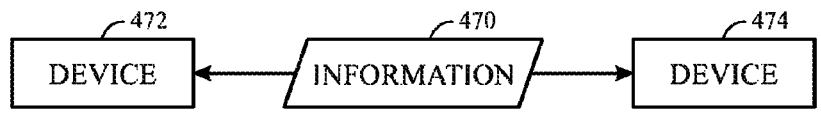
FIG. 6 illustrates an exchange of information between devices, with at least one device being part of the smart-home environment, according to an embodiment.

The network layer 456 may route data between the devices 10 using a communication protocol based on Internet Protocol version 6 (IPv6). As such, each device 410 may include a 128-bit IPv6 address that may provide each device 410 with a unique address to use to identify itself over the Internet, a local network or a fabric overlaying a group of networks, or the like. In some embodiments, the network layer 456 may identify a protocol (e.g., RIPng) that determines how data is routed between the devices. As illustrated in FIG. 6, using one or more layers, information 470 (e.g., alarm states, security information, etc.) may be exchanged between devices 472 and 474.

III. Communication Between Devices over BLE

Bluetooth® Low Energy (BLE) is a wireless personal area network communication type that provides a relatively low-power connection between two devices. BLE includes a protocol stack, such as the protocol stack 475 illustrated in FIG. 7. The protocol stack 475 includes an application layer 476 that supports software applications that interface with a user. The protocol stack 475 also includes layers that are located within a host 477 and a controller 478. In some embodiment, the host 477 may be located on or more processors or chips while the controller 478 may be included on a discrete host controller chip. As illustrated, within the host 477, a General Access Profile (GAP) 479. The GAP 479 defines the generic procedures related to discovery of Bluetooth devices and link management aspects of connecting to Bluetooth devices. In addition, this profile includes common format requirements for parameters accessible on the user interface level. The GAP 479 also defines roles for devices including a broadcaster role, an observer role, a peripheral role, and a central role. A device operating in the broadcaster role can send advertising events. A device operating in the observer role is a device that receives advertising events from the broadcaster. A device that accepts an establishment of a BLE physical link using a connection establishment procedure is in a peripheral role also known as a slave role. A device acting in a central role initiates establishment of a physical connection. The central role may also be referred to as a master role.

The protocol stack 475 also includes a Generic Attribute (GATT) profile 480. The GATT profile 480 defines a generic service framework using an attribute protocol layer 481. This framework defines the procedures and formats of services and their characteristics. It defines the procedures for Service, Characteristic, and Descriptor discovery, reading, writing, notifying, and indicating, as well as configuring the broadcast of characteristics. The GATT profile provides a mechanism for sending and receiving short pieces of data known as "attributes" over a BLE connection. GATT is generally available on most or all implementations of BLE. Thus, although other profiles may be available, GATT may be widely available on smart network devices and/or personal electronic devices (e.g., cellular phone, iPad, etc.).

GATT is built on the notion of multiple characteristics. Each characteristic has a single, fixed-width value with a maximum size of 512 bytes with most implementations using 128 bytes. Generally, characteristics are assigned Universally Unique Identifiers (UUIDs) having a consistent size (e.g., 16-bit, 128-bit). Characteristics are grouped into sets known as GATT services that each has its own UUID. Moreover, the GATT profile 480 defines server and client roles. The client device is the device that is to receive data, and the server device is the device that has the data and is to transmit data.

The attribute protocol layer 481 defines a client/server architecture above a BLE logical transport channel. The attribute protocol layer 481 allows a device referred to as the GATT server to expose a set of attributes and their associated values to a peer device referred to as the GATT client. These attributes exposed by the GATT Server can be discovered, read, and written by a GATT Client, and can be indicated and notified by the GATT Server. All the transactions on attributes are atomic. The protocol stack 475 also includes a security manager protocol (SMP) 482. The SMP defines procedures and behavior to manage pairing, authentication, and encryption between devices.

The protocol stack 475 also includes a Logical Link Control And Adaption Protocol (L2CAP) 483. L2CAP is the reliable, multiplexed, packet-oriented transport on which all BLE profiles and application protocols ultimately depend. The L2CAP supports higher-level protocol multiplexing, packet segmentation and reassembly, and the conveying of quality of service information. Furthermore, L2CAP enables higher-level protocol/layers and applications to transmit and receive upper-layer data packets up to 64 kilobytes in length. L2CAP also permits per-channel flow control and retransmission. Furthermore, the L2CAP layer provides some error control that is designed to detect the occasional undetected errors in the baseband layer and request retransmission of the affected data.

If an L2CAP API were available on every Weave target platform, it would be the BLE interface of choice for Weave due to its reliability and conceptual similarity to IP-based streaming sockets. However, an L2CAP API is available on neither Android nor iOS, so the design of Weave over BLE is constrained to the GATT application layer.

The protocol stack 475 also includes a host controller interface (HCI) 484 for implementing a command, event, and data interface for allowing link layer access from upper layers such as GAP 479, L2CAP 483, and SMP 482.

Figure 7:
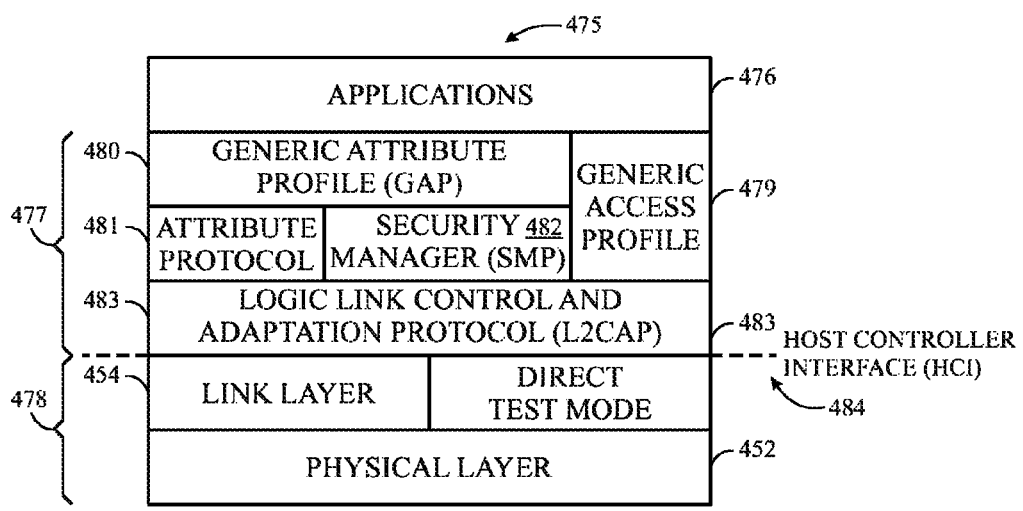
FIG. 7 illustrates a protocol stack of BLE communications, according to an embodiment.
Figure 8:
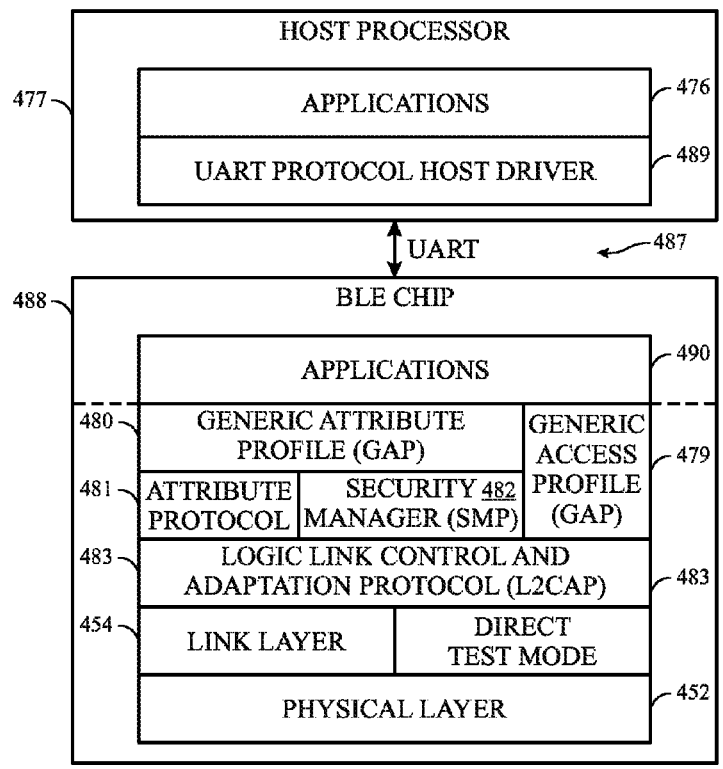
FIG. 8 illustrates an alternative protocol stack of BLE communications, according to an embodiment.

FIG. 8 illustrates an alternative arrangement of the protocol stack 486 of FIG. 7. Specifically, in FIG. 8, a protocol stack 486 does not include the HCI 484. Instead, the protocol stack 486 includes a Universal Asynchronous Receiver Transmitter (UART) 487 to provide a communication path between a host processor 477 and a BLE chip 488. Also, note that the BLE chip 488 implements all stack elements below and including the GAP 480. The protocol stack 485 also includes a UART protocol host driver 489 that drives communication on the UART 487 path. The protocol stack 485 also includes an application 490 running on the BLE chip 488 that passes GATT commands and events between the BLE chip 488 and the host processor 478.

Figure 9:
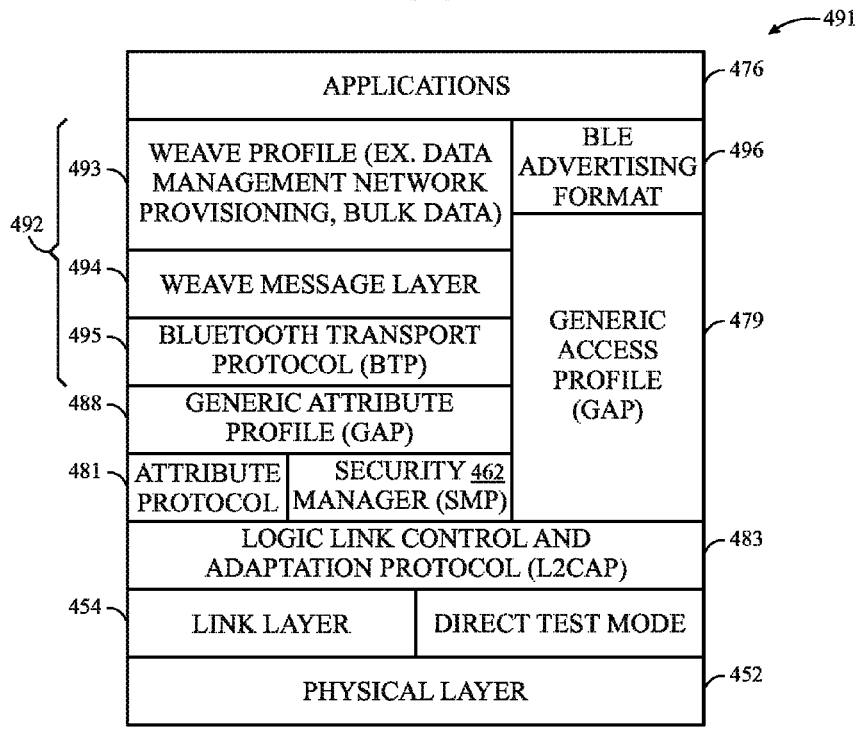
FIG. 9 illustrates a protocol stack of weave layers atop BLE layers, according to an embodiment.
Figure 10:
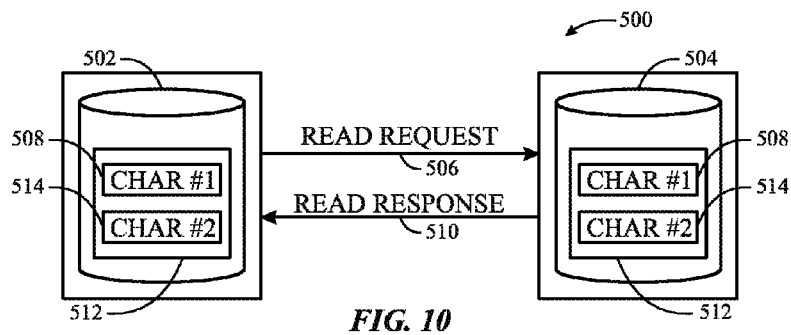
FIG. 10 illustrates a schematic view of an exchange of information between devices using a relatively low power network connection, according to an embodiment.

FIG. 9 illustrates a nested protocol stack 491 that includes a weave platform 492 on top of the BLE platforms of FIG. 7 or 8. As illustrated, the weave platform 492 includes a weave profile layer 493, a weave message layer 494, a BTP layer 495, and an advertising format layer 496. The weave profile layer 493 includes different profiles used to perform functions with the weave networks. The weave message layer 494 translates the profile messages into weave messages for the profile messages. The BTP layer 495 enables translation of the weave messages into BLE messages as discussed below. The BLE advertising format layer 496 instructs how to advertise or translate advertising packets. Reading/Writing in GATT Table BLE GATT interactions can be characterized as having a client role and a server role as illustrated in FIG. 10. As illustrated, GATT interaction 500 includes both a client 502 and a server 504 role. The client 502 is the device that is to receive data, and the server is the device that has the data and is to transmit data. The client 502 may also be referred to as a BLE central device, and the server may be referred to as a BLE peripheral device. The client 502 may write values, read values, or subscribe by requesting to receive indications or notifications from the server when the value changes. The client device 502 reads data from a server device 504 by issuing a read request 506 to one or more of the server device's characteristics 508. The client can issue a write request 510 to update the one or more characteristics 508. The write request 510 may include a write request that generates a confirmation from the server either larger, equal to, or smaller than a maximum transfer unit (MTU).

Characteristics are organized into sets called services. For example, a Weave service UUID may be 0000FEAF-0000-1000-8000-00805F9B34FB with two characteristics C1 (UUID: 18EE2EF5-263D-4559-959F-4F9C429F9D11) and C2 (UUID: 18EE2EF5-263D-4559-959F-4F9C429F9D12). A GATT application profile defines one or more services, their characteristics, and the rules that govern how these characteristics are manipulated and interpreted.

Each characteristic has a single value whose data payload may be up to 512 bytes in length. However, this maximum size may be much smaller than the maximum message size capable over a Weave protocol. For this reason, a fragmentation and reassembly scheme for Weave messages is defined at the BLE application layer in the form of a BlueTooth Transfer Protocol (BTP).

Each service and characteristic on a GATT server is assigned a Universally Unique Identifier (UUID). For example, custom, randomly assigned UUIDs are 128 bits in length, and SIG-assigned UUIDs may be 32 or 16 bits in length.

As discussed below, a general service offers a GATT table that enables both devices to treat BLE as a bi-directional data communication. The GATT server 504 hosts the characteristics 508 and provides the GATT client 502 the ability to read, write, and/or subscribe to the characteristics 508. Moreover, since, in some embodiments, the general service is included in all BLE advertisements, the general service may be used to enable bi-directional communication between the devices in numerous use cases, such as device pairing, alarm hushing, or other uses suitable for communicating over BLE. In some embodiments, the GATT server 504 may implement one or more services 512 each including one or more characteristics 508 for the bi-directional communication between the devices. Furthermore, in some embodiments, each characteristic 508 may have a different type and/or permissions. For example, a first characteristic 508 may provide the client the ability to read and write while another characteristic 514 provides the client the ability only to read or see indications of the values therein.

Thus, GATT servers advertise GATT services and maintain the canonical values of those services' characteristics. GATT clients connect to GATT servers, and may write, read, or subscribe to the value of a server's characteristics. If a client has subscribed to the value of a particular characteristic, the server may change this characteristic's value and then send a GATT indication (with or without receipt request from the client) to notify the client that the value has been updated. In some cases, GATT read requests, write requests, subscribe requests, and indicate requests may be reliably transmitted with acknowledgments received from the server.

The read operation may be used to retrieve the full value of a characteristic from a server in response to a GATT notification or indication, where the indication may contain only a partial characteristic value that the client discards. In some embodiments, BTP does not follow this process, and instead, BTP uses indications to send full characteristic values from server to client. The characteristic size is adjusted per connection based on the value of MTU of the GATT. BTP reduces latency and maximizes bandwidth on the server-to-client data path by foregoing the read operation.

A single GATT characteristic read, write, subscribe, or indication may be considered reliable since GATT is supported by the Logical Link Control and Adaptation Protocol (L2CAP), which in turn is supported by the LE asynchronous connection (LE ACL) logical transport. These layers provide error detection, data retransmission, and flow control for individual GATT operations.

As previously discussed, the size of a maximum transfer unit (MTU) in different BLE implementations can range from a minimum of 23 bytes to the maximum of 512 bytes (with some characteristics capped at a length of 128 bytes related MTUs may be limited to the same values). These values are decided locally depending on the device's capabilities. In certain cases, the MTU size can be negotiated between peers. If neither the client 502 nor the server 504 knows the MTU, the server 504 may respond with an acceptable fragment size (e.g., 20 bytes) as a maximum value that is safe to assume due to the BLE specification. In this case, even if the server 504 receives indications with payload greater than this number bytes, the server 504 will only read the first number (e.g., 20) of bytes of the payload. In some embodiments, the client 502 will will always send 128-byte characteristic writes. In cases where all bytes of characteristic data cannot be transferred in one connection event, multiple connection events are used to transfer the bytes of the characteristic data. Moreover, in certain embodiments, a fragment size value (e.g., $2^{16}-1$, unsigned) may be reserved to indicate that the MTU will be dynamically determined from a size of the payload.

Figure 11:
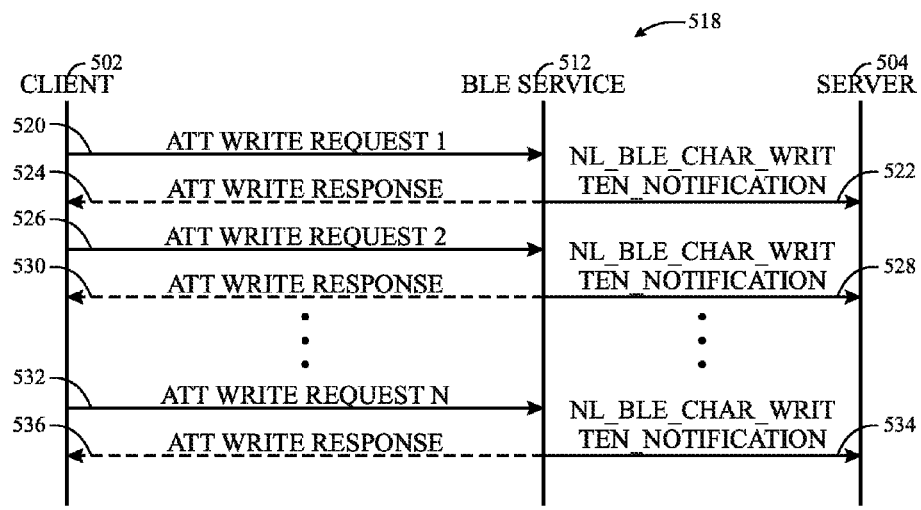
FIG. 11 illustrates a schematic view of an exchange of information between devices using Bluetooth low energy (BLE), according to an embodiment.

FIG. 11 illustrates a communication 518 between the client 502 and the server 504 through the BLE service 514 when the client 502 writes to the characteristic 508. The client 502 sends an attribute write request 520 to write to one of the attributes of the BLE service 514. The BLE service 514 sends a notification 522 to the server 504 that the character 508 has been written to or attempted to be written to. In some embodiments, the BLE service 514 sends a write response 524 confirmation of success, a notification of failure, and/or other information related to the write request 520. Similarly, a second attribute write request 526 invokes a notification 528 and a write response 530. This process continues until a final attribute write request 532 for the communication 518 causes the BLE service 514 to send a notification 534 and a write response 536.

Figure 12:
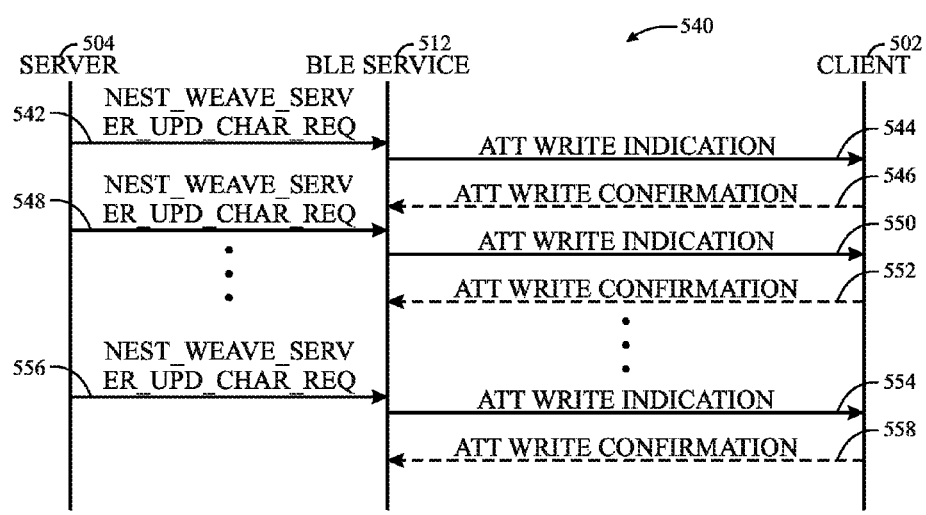
FIG. 12 illustrates a schematic view of an exchange of information between devices when a server writes to a characteristic in a BLE service, according to an embodiment.

FIG. 12 illustrates a communication 540 when the server 504 updates to the characteristic 514 via the BLE service 512. The server 504 updates an attribute in the characteristic 514 in the BLE service 512 with an update request 542, and the update is indicated to the client 502 via an update indication 544. In some embodiments, the client 502 sends an indication confirmation 546 to the BLE service 512 upon completion of a transfer of the updated data to the client 502. In such embodiments, the server 504 may wait to send a second update request 548 until receiving the confirmation 546 to reduce likelihood of data loss. Once the second update request 548 is received at the BLE service 512, an attribute update indication 550 is sent to the client 502 and invokes a confirmation 552. The process continues until a final attribute update request 556 is sent by the server 504 that invokes an update indication 554 and an indication confirmation 558.

Figure 13:
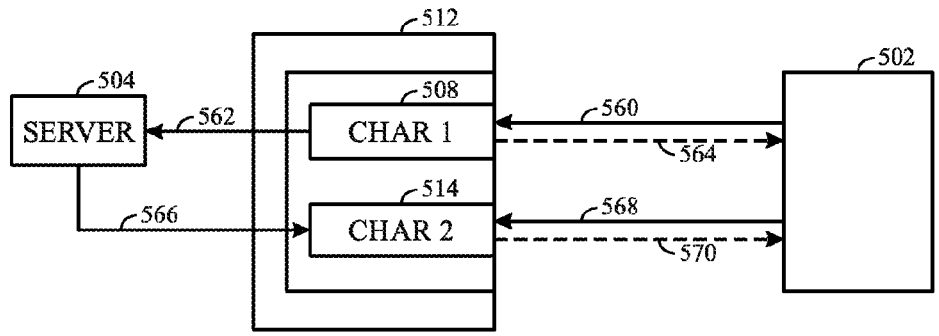
FIG. 13 illustrates a block diagram view of interactions between a client and service via the BLE service of FIG. 9, according to an embodiment.

FIG. 13 illustrates a block diagram view of interactions between the client 502 and the server 504 via the BLE service 512. In the illustrated embodiment, communications flowing from the client 502 to the server 504 flow through the first characteristic 508. In other words, the client 502 sends data to the server 504 using an attribute write sent 560 via the first characteristic 508. The updated first characteristic is sent to the server 504 via a characteristic update notification 562. In some embodiments, the BLE service 512 sends a write confirmation 564 that notifies the client 502 that another write request may be sent.

Communications from the server 504 to the client 502 may be sent using the second characteristic 514. For example, the server 504 may send a characteristic update request 566 to the BLE service 512. In response, an update indication 568 may be sent to the client 502. In certain embodiments, the client 502 sends an indication receipt confirmation 570 that informs the BLE service 512 that the second characteristic 514 may be updated with a new value without risking data loss to the client 502.

Weave (or other communication protocols) may be transmitted over BLE. However, GATT is a characteristic-based communication protocol while Weave is a message-based protocol. Furthermore, a single Weave message payload may be larger than the maximum size of a GATT characteristic. For example, a single Weave message may have a size of 1,500 bytes while the BLE implementation may limit communications to a significantly smaller number (e.g., 27 bytes or 128 bytes). Thus, to use BLE in the smart network using Weave, a higher-level layer (e.g., application layer, transport layer, etc.) may deploy a streaming socket, Bluetooth Transfer Protocol (BTP), built on top of GATT. Weave uses BTP to split Weave messages into multiple fragments which may each be transmitted via single GATT writes or indications. Furthermore, as previously discussed, the MTU may be larger than at least some characteristics. In certain embodiments, a characteristic used to send indications to the BLE client may be limited to the size of the MTU negotiated in the BLE handshake.

BTP defines its own notion of a transport layer connection on top of the underlying BLE connection. This design enables certain Weave protocols to function over BLE, such as a Certificate Authenticated Session Establishment (CASE) protocol or a Password Authenticated Session Establishment (PASE) protocol as taught in U.S. patent application Ser. No. 14/508,933, titled "Authenticated Session Establishment," which was filed on Oct. 7, 2014, and which is incorporated by reference in its entirety. It also lets devices using Weave over BLE devices check protocol version compatibility and exchange certain data as part of the BTP connect handshake.

A BTP connection may open and close with no effect on the state of the underlying BLE connection, except in the case where a BTP connection is closed by the peripheral device. In some embodiments, peripherals can only signal the end of a BTP connection by closing the underlying BLE connection to the central. Alternatively, an in-band mechanism for peripherals to close BTP connections may be used.

Before a BTP connection can be initiated, a central device establishes a BLE connection via a handshake to a peripheral device. Once a BLE connection has been formed, central devices shall assume the GATT client role for BTP connection establishment and data transfer, and peripheral devices assume the server role.

Figure 14:
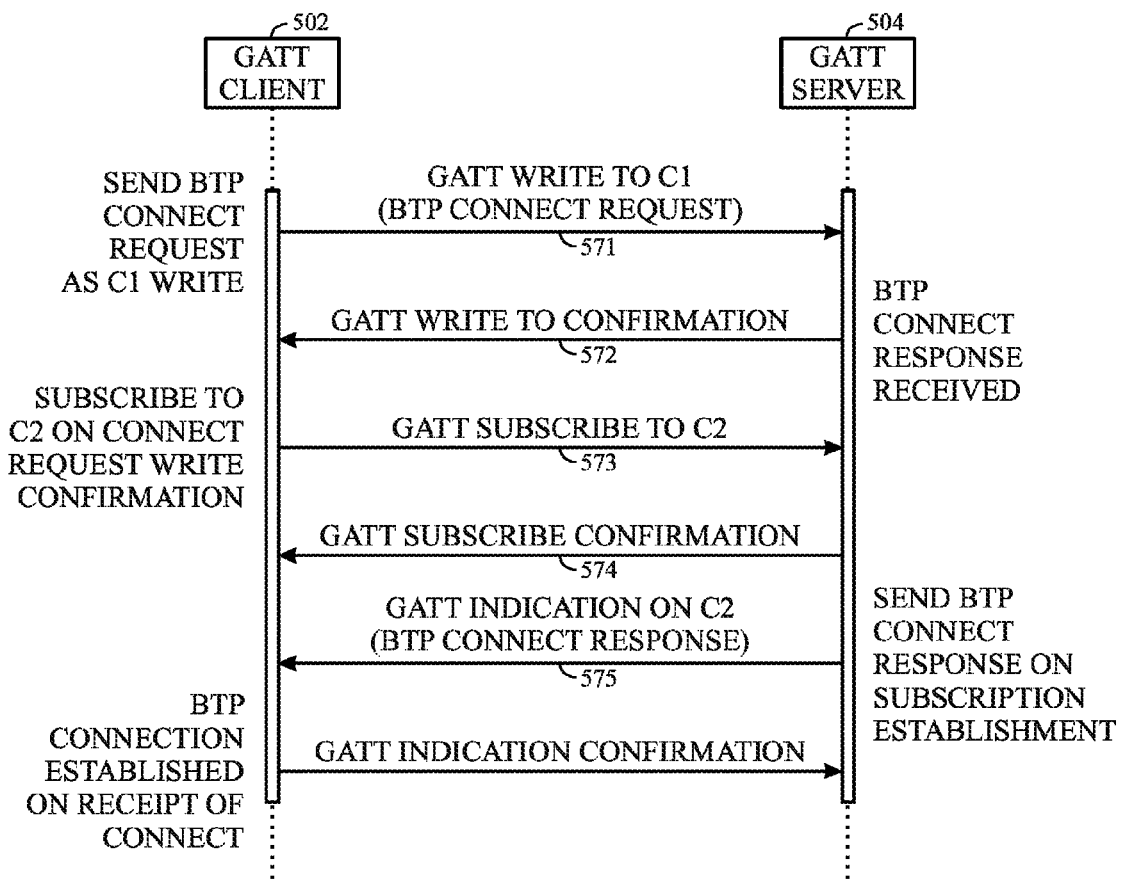
FIG. 14 illustrates a data exchange that occurs between a GATT client and a GATT server during a BLE Transfer Protocol (BTP) establishment, according to an embodiment.

FIG. 14 illustrates a sequence of operations in the BTP connect handshake. To initiate a BTP connection, a GATT client 502 sends a BTP connect request block 571 to the peripheral via a confirmed write on characteristic C1 of the Weave service. The connect request block 571 includes two check bytes, a list of BTP protocol versions supported by the client, the client's observation of the BLE connection ATT_MTU, and the client's maximum receive window size. The list of supported protocol versions may be sorted in descending numerical order. If the client cannot determine the connection's ATT_MTU, it shall specify a value of 0 for this field in the connect request. The check bytes 1 and 2 may have ASCII values of "n" and "1", respectively, with hexadecimal values of 0x6E and 0x6C. For a detailed specification of the connect request binary data format. The server 504 then sends a GATT write confirmation 572 as a BTP connect response received message.

Once the BTP connect request write operation completes successfully indicated by receipt of the GATT write confirmation 572, the client 502 subscribes to indications on the value of Weave service characteristic C2 using a GATT subscribe request 573. To do this, the client 502 sets an indication bit of C2's client characteristic configuration descriptor to 1.

Once the GATT server 504 has received a client's 502 BTP connect request and confirmed the client's 502 subscription to C2 via a subscription confirmation 574, the server 504 sends a BTP connect response 575 to the client via an indication on C2. This response contains the same two check bytes along with the window size, maximum BTP packet size, and BTP protocol version selected by the server.

The server 504 selects a window size equal to the minimum of its and the client's 504 maximum window sizes. Likewise, the server 504 shall select a maximum BTP packet size for the connection by taking the minimum of 128 bytes (the maximum characteristic value length of C1 and C2) and all nonzero ATT_MTU values observed for the server 504 and the client 502. If neither server 504 nor client 502 observes the BLE connection's ATT_MTU, a default maximum packet size (e.g., 20 bytes) may be selected.

The server 504 selects a BTP protocol version that is the newest which the server 504 and the client 502 both support, where newer protocol version numbers are higher than those of older versions. The version number returned in the connect response 575 determines the version of the BTP protocol used by client 502 and server 504 for the duration of the connection. If the server 504 determines that the server 504 and the client 502 do not share a supported BTP protocol version, the server 504 closes its BLE connection to the client 502.

When a client 502 sends a connect request 571, it starts a timer with a globally defined duration (e.g., 5 seconds). If this timer expires before the client 502 receives a connect response 575 from the server, the client 502 closes the BTP connection and reports an error to the application. Likewise, the server 504 starts a timer with the same duration when it receives a connect request 571 from the client 502. If this timer expires before the server 504 receives a subscription request 573 on C2, the server 504 closes the BTP connection and reports an error to the application.

Figure 15:
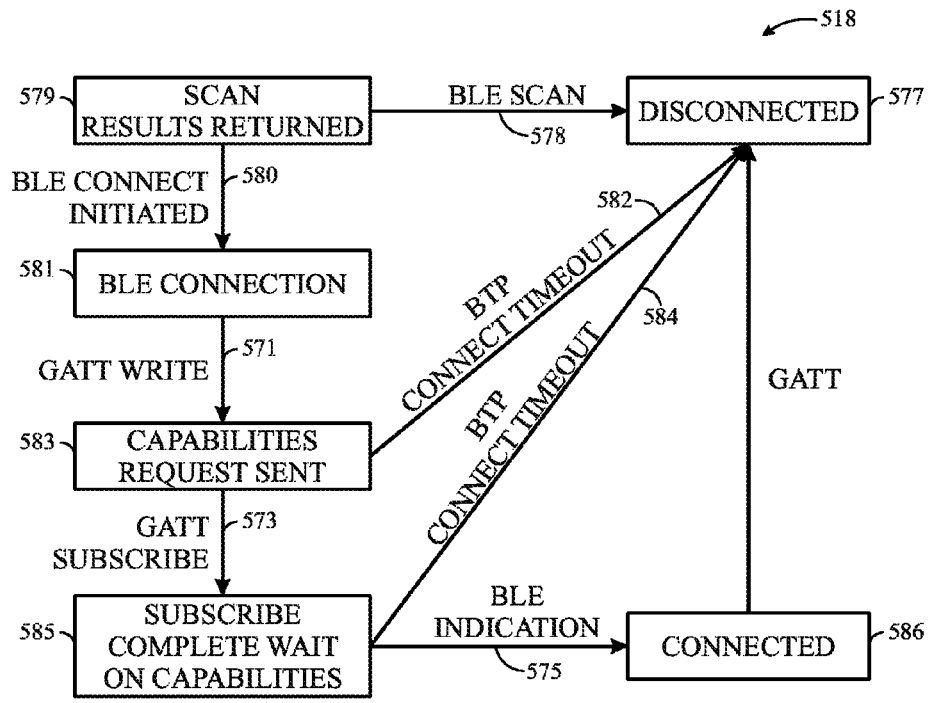
FIG. 15 illustrates a state machine showing GATT client behavior during the BTP establishment of FIG. 14, according to an embodiment.

FIG. 15 illustrates a state machine 576 for states for the GATT client 502 during the BTP establishment. Specifically, the client 502 begins in a disconnected state 577. The client 502 performs a BLE scan 578 to obtain scan results 579. A BLE connection with one of the results is to be initiated 580 placing the client 502 in a BLE connection state 581. The client 502 then sends the GATT write 571 that causes the client 502 to enter into a capabilities request sent 583 that starts a timer. If the client 502 receives the GATT subscribe 573 before the timer elapses, the client 502 enters a subscribe-complete-wait-on-capabilities state 585. If the client 502 does not receive the GATT subscribe 573 before the timer elapses, the client 502 returns to the disconnected state 577 as a timer 582. In the subscribe complete state 585, the timer continues running and/or a new timer begins, if a timer elapses before receiving the GATT indication 575, the client 502 returns to the disconnected state 577 as a timeout 584. Otherwise, the client 502 connection has been completed and enters a connected state 586.

Figure 16:
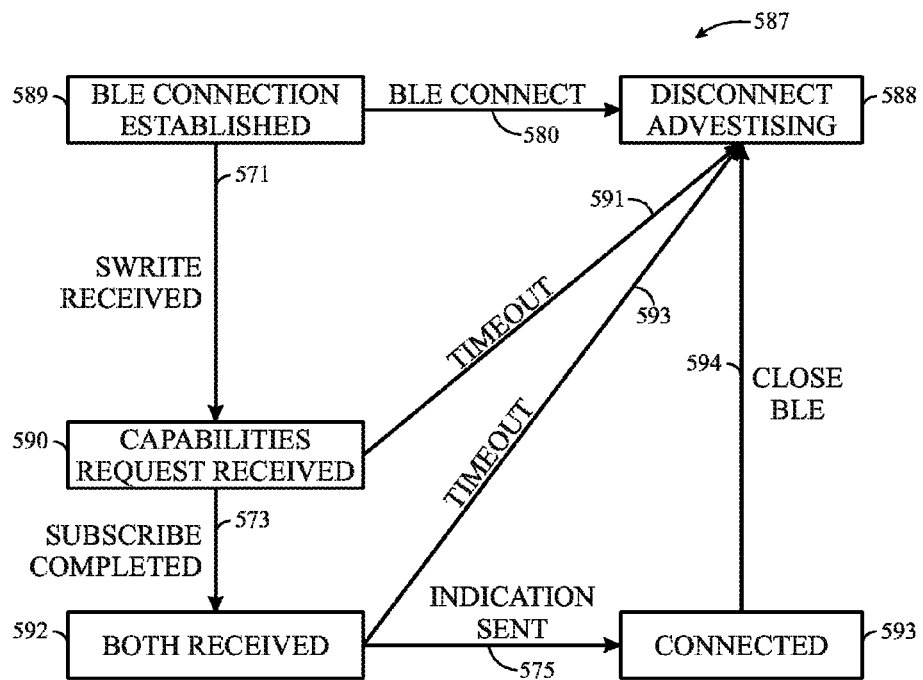
FIG. 16 illustrates a state machine showing GATT server behavior during the BTP establishment of FIG. 14, according to an embodiment.

FIG. 16 illustrates a state machine 587 for the GATT server 504 during the BTP establishment. The server 504 begins in a disconnected state 588 where the server 504 sends out BLE advertisements as discussed herein. When a client 502 begins a BLE connection 580. The server 504 enters into a BLE connection established state 589 where the server 504 waits on a capabilities of the client 502. When the write 571 is received, the server 504 enters a capabilities request received state 590. A timer begins in such state, if the subscribe request 573 is not received before the timer elapses, the server 504 returns to the disconnected state 588 as a timer 591. Otherwise, the server 504 enters into a capabilities request state with subscribe received state 592. The timer from state 590 continues running. If the subscription 573 is not received before this timer elapses, the server 504 returns to the disconnected state 588 as a timer 593 and begins advertising again. Otherwise, the server 504 enters and remains in a connected state 593 until the BLE connection is closed by a close BLE 594.

To send Weave message fragments, BTP defines 2 GATT characteristics: one for message fragments sent from the GATT client to the server, and the other for fragments sent from the server to the client. The client sends fragments to the server on the first characteristic via GATT writes. Once the client subscribes to the second characteristic, the server uses it to send fragments to the client via GATT indications.

In some embodiments, as previously discussed, BTP includes waiting to transmit all but the first message fragment until a GATT write or indication confirmation is received in response to transmission of the previous fragment. If BTP didn't wait for GATT operation acknowledgements before it sent additional fragments, the remote GATT server or client might aggregate all values received for a given characteristic before it acknowledged any of the corresponding GATT operations. Furthermore, in some cases, the server or the client may have substantially larger messages and/or processing power and may quickly overwhelm the other device if no acknowledgments were used before causing at least some of the fragments to be lost. In other words, only the most recently received value would be passed from the GATT stack to the application layer. This behavior would be correct according to the GATT profile, since characteristic values are last-write-wins, but such behavior would be bad for BTP due to the data loss.

A. BLE Controller Architecture

GATT may provide flow control, error detection, and payload retransmission for individual writes and indications. However, in many implementations, this flow control and much of the core GATT functionality is managed by a separate BLE controller chip independent of a platform's host processor.

In many implementations, it is this BLE controller which transmits GATT acknowledgements in response to received write and indication requests. The controller may transmit these acknowledgements before the received data has actually made it to the host processor's application program. In other words, the received data may not be transmitted back up the OSI model stack through the various layers to the application layer. For this reason, GATT acknowledgements may not be adequate to confirm that a given message fragment has been received by a remote BTP application.

Furthermore, on embedded platforms, there may be very small queues between the BLE controller, BLE driver on the host processor, and host processor's BLE application. If the remote device sends GATT writes or indications faster than these queues can be emptied, message fragments which were acknowledged at the GATT layer by the BLE controller will be dropped before they make it to the BTP stack on the host processor. To solve this problem, BTP provides an application-layer mechanism to exert back-pressure on the sender. Using this mechanism, a sender knows when to pause further GATT transmissions even if all previous outgoing writes or indications have been acknowledge by the remote BLE controller.

Moreover, certain BLE controllers may experience random resets or drop acknowledged GATT characteristic updates before they are transmitted to the host processor. BTP adds functionality to be able to detect and recover from these failures.

B. Error Detection

The integrity of data transmitted via GATT may be maintained by L2CAP's payload error detection and retransmission facilities for incomplete message transmissions. Thus, the type of errors missed by L2CAP's payload error detection to be detected by BTP include those where whole message fragments have been dropped or re-ordered by a malfunctioning BLE controller. If the BLE controller resets during a BTP conversation, it may permanently drop BTP message fragments, even after these fragments have been acknowledge at the GATT layer. BTP may detect this failure scenario and reset the connection when it occurs to reduce the likelihood of message data corruption. If the BLE controller re-orders GATT characteristic writes or indications, BTP may also detect this failure and reset the connection to reduce the likelihood risk message data corruption.

C. Message Formatting

Figure 17:
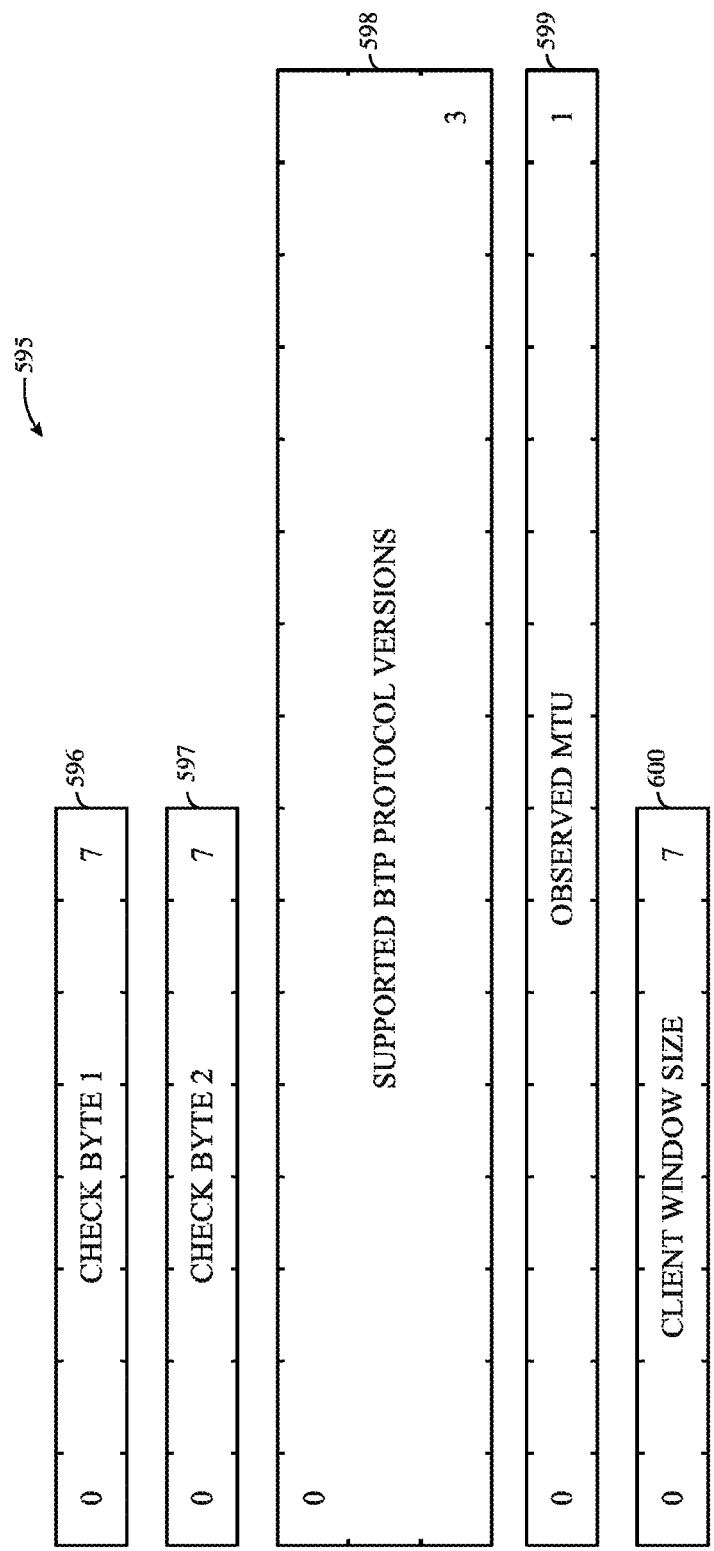
FIG. 17 illustrates a BTP connection request used in the BTP establishment of FIG. 14, according to an embodiment.

FIG. 17 illustrates an embodiment of a block 595 of a BTP connect request. The block 595 includes a first check byte 596, a second check byte 597, a supported BTP protocol versions field 598, an observed MTU 599, and a client window size 600. The check bytes include a byte or another length of data that are used to confirm received messages have been received properly. In some embodiments, more or less fields may be included having shorter, same length, or longer sizes. The supported BTP protocol versions field 598 includes a list of predetermined length (e.g., 4-bit) unsigned integer supported BTP protocol versions, sorted in descending numerical order for a total of 8 list elements. A value of 0 indicates an unused list element. The observed MTU 599 includes a length (e.g., 2 bytes) of data that is a value of the MTU observed by the client 502 for the corresponding BLE connection. If the value is 0, the MTU could not be observed. In some embodiments, the value may be represented as an unsigned integer in a big-endian format. The client window size 600 includes a value of maximum receive window size supported by the server 504. The client window size 600 may be specified in units of BTP packets where each packet may be up to 128 bytes in length. In some embodiments, the client window size 600 may be represented as an unsigned integer.

Figure 18:
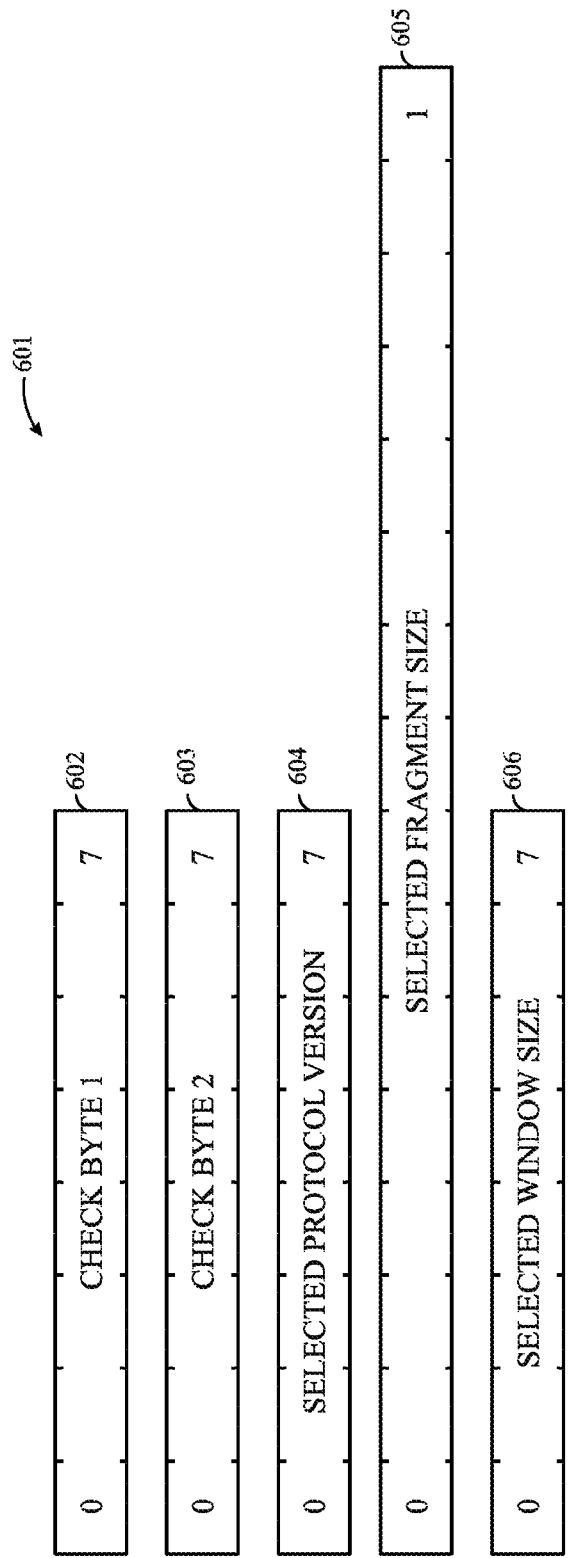
FIG. 18 illustrates a BTP connection response used in the BTP establishment of FIG. 14, according to an embodiment.

FIG. 18 illustrates an embodiment of a block 601 of a BTP connect response. The block 601 includes a first check byte 602, a second check byte 603, a selected protocol version 604, a selected fragment size 605, and a selected window size 606. The first and second check bytes should match the first and second check bytes of the block 595. The selected protocol version 604 includes a BTP protocol version supported by the client 502 and the server 504 and selected by the server 504. The selected fragment size 605 indicates a value of maximum BTP fragment size selected by the server 504. The selected window size 606 indicates a maximum receive window size for the server 504 in units of BTP blocks.

BTP message fragments are sent with sequence numbers that enable acknowledgments and/or message resorting when chronological order is lost. The BTP stack sends periodic acknowledgements of its most recently received message fragments. The BTP stack also closes the connection if it does not receive acknowledgements for its own sent fragments within a set time period. Each side (e.g., server and client) of a connection defines a receive window to exert application-layer (relative to GATT) backpressure on a sender when the receiver's queues are full. Each side sends periodic keep-alive messages when a BTP connection is open but there is no application data to send.

Figure 19:
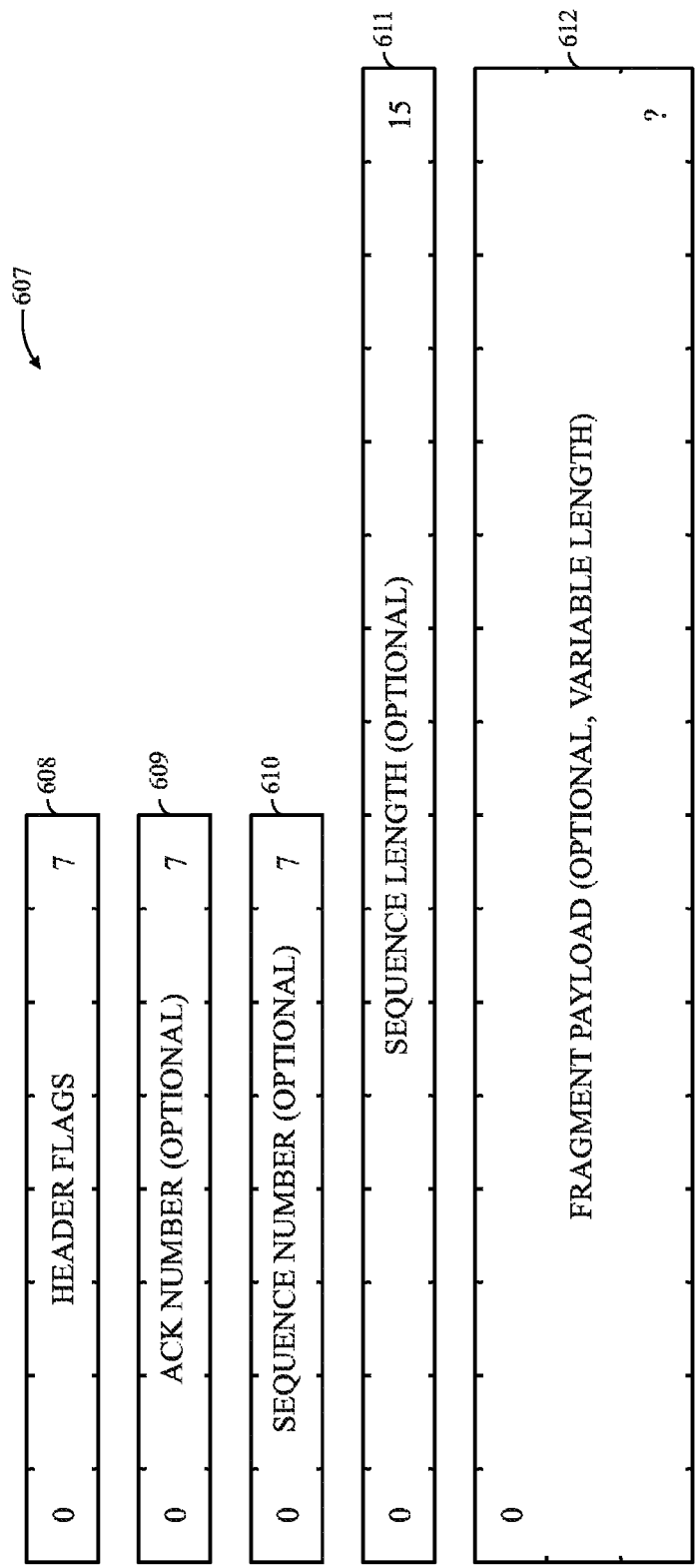
FIG. 19 illustrates a block of data that may be exchanged between the devices of FIG. 7, according to an embodiment.

FIG. 19 illustrates an embodiment of a block 607 of data that is sent using the BTP. The block 607 includes header flags 608 that identifies a type of message being sent, an acknowledgement number 609 that identifies the message as an acknowledgment of a previous message, a sequence number 612 that identifies order of messages in a string of messages, a message length 608 that indicates a length for the message and/or for each block, and a fragment payload 612 that includes the data being shared between the client 502 and the server 504. In some embodiments, the one or more header flags 608 may be included in a single message. For example, a message may include a message fragment and an acknowledgment. Moreover, in certain embodiments, flag values may be selected from those presented in Table 1 below:

TABLE 1

Header flags

| Flag Name | Flag Value |
|---|---|
| Start message | 0x01 |
| Message data (i.e. middle message" | 0x02 |
| End message | 0x04 |
| Fragment acknowledgment | 0x08 |
| Keep alive message | 0x10 |

A start message header indicates that the message includes the message length 611 in the block 607. In some embodiments, this message length indicates a length of the entire message and not just the data in the currently described block 607. The start message header also indicates that the sequence number 610 and a fragment payload 612 are included in the block 607. The message data header indicates the presence of a non-terminating message fragment (i.e., not the end of the message) with a data length equal to a negotiated fragment size (MTU) minus the header overhead. The message header also indicates that the sequence number 610 and the fragment payload 612 are included in the block 607. The end message header indicates that the fragment payload 612 includes the end of the message. The length of this message is determined by the remaining amount of data of the message that has not been sent as indicated by the message length 611. The end message header also indicates that the block 607 includes the sequence number 610 and the fragment payload 612. The fragment acknowledgment header indicates that an acknowledgment 609 is included in the block 607 regardless of whether the sequence number 610 or the fragment payload 612 are included. The keep alive header indicates that the message includes the sequence number 610 along with the header data but has no other fields.

D. Sequence Numbers

Sequence numbers enable detecting whether a local or remote BLE controller has reset or re-ordered its received GATT requests. Sequence numbers also facilitate the determination of BTP receive windows and transmission of keep-alive messages.

All BTP message fragments are sent with a sequence number These sequence numbers are unsigned 8-bit integers which increase monotonically by 1 for each message fragment sent with one. Sequences numbers are defined and incremented separately for each BTP connection maintained by a system. For each connection, the BTP stack on a single device will maintain separate sequence number counters for sent and received message fragments. When a new BTP connection is formed, its sequence numbers are initialized to a starting number (e.g., 0). Sequence numbers wrap back to the starting number once they exceed a size available to be represented in a predefined number (e.g., 8) of bits allocated for the sequence numbers. For example, in embodiments where 8 bits are allocated to sequence numbers, available sequence numbers are 0 to 255 (e.g., 255=28-1). Thus, in such embodiments, a message fragment having a sequence number of 255 is followed by a message fragment having a sequence number of 0.

If a device receives a message fragment with an unexpected sequence number, it resets the corresponding BTP connection. Such a failure indicates a failure of L2CAP's reliability mechanisms or an error on the BLE controller.

1. Sequence Number Acknowledgment

Sequence number acknowledgements support the BTP receive window. Sequence number acknowledgments also provide a signal that the BTP stack on the other side of a connection remains up and healthy.

When it sends a message fragment, the BTP stack starts a timer (the "acknowledgement received" timer) if this timer is not already running. The duration of this timer is defined as the "acknowledgement timeout interval." The stack restarts this timer when a valid fragment acknowledgement is received for any but the most recently sent unacknowledged message fragment. Fragment acknowledgements are received as unsigned 8-bit integers piggybacked onto BTP message fragments, or as standalone acknowledgements with no sequence numbers or message payloads. This timer stops if an acknowledgement is received for the most recently sent and unacknowledged message fragment. If this timer expires or an invalid fragment acknowledgement is received, the stack resets the connection.

An acknowledgement is invalid if the acknowledged sequence number does not correspond to an outstanding, unacknowledged BTP packet sequence number.

When the BTP stack receives a message fragment with a sequence number, the BTP stack records this sequence number as the connection's "pending acknowledgement" value and starts a timer (the "send acknowledgement" timer) if this timer is not already running. The duration of this timer is defined as one-half of the acknowledgement timeout interval to ensure acknowledgements will be received before a sender closes the connection for lack of them.

The stack stops this timer when the pending acknowledgement is sent. If this timer expires and the stack has a pending acknowledgement, the acknowledgement is immediately sent as a fragment with no message payload. If the stack sends any message fragment before this timer expires, it piggybacks the pending acknowledgement on the sent message fragment and stops the timer.

In some embodiments, if the BTP stack detects that its number of pending acknowledgments to send has shrunk to an immediate-send threshold (e.g., 2 or fewer message fragments left in a receive window), it immediately sends any pending acknowledgement.

E. Receive Window

A receive window ensures proper sequencing by enabling application-layer flow control on top of GATT between both devices in a BTP connection. The receive window blocks fragment sequence numbers from wrapping unexpectedly. Both devices (e.g., client and server) of a BTP connection define a receive window, where the window size is the number of sequential message fragments each side determines that it can reliably receive without acknowledgment. In some embodiments, an initial window size is established for both devices in a BLE connection as part of the BTP connect handshake. In certain embodiments, the receive window may have a maximum size that is decremented for pending interactions. In some embodiments, the receive window is capped at half the number of possible sequence numbers. For example, if the possible sequence numbers are 0-255, the maximum window size may be defined as 127. Setting such limit on the receive window blocks unacknowledged sequence number wrap-around. For example, such limits block receiving a newer initial sequence number 0 for a message fragment that is sent when an older expected number below the median sequence number 127 could also be received.

In certain embodiments, both sides maintain a counter to reflect each other's current receive window size. For example, the client 502 may maintain a counter to reflect a window size of the server 504. This counter is decremented whenever a new message fragment is sent. When a message acknowledgement is received, the counter is incremented by ((acknowledged sequence number—oldest unacknowledged sequence number)+1). If the counter is 0, the sender refrains from sending further message fragments until the counter is incremented. If the counter is incremented from 0 on receipt of a message fragment, the sender immediately resumes message fragment transmission.

For an example, the GATT client 502 may send a data block with a connect response acknowledgement. During the handshake, the maximum window for the server 504 and the client 502 is set to four messages. When a second message is sent from the client 502 to the server 504, the receive window size for the server 504 shrinks to two causing the server 504 to send an acknowledgment prior to send acknowledgment. Increasing the receive window for the server 504 back to three and decrementing the receive window for the GATT client to three from four.

In some embodiments, both devices using BTP in a BLE connection maintain a counter of their own receive window sizes. These counters are based on the sequence numbers of the last message fragment received by the respective device and the last acknowledgement sent by the respective device. This counter is used to send early acknowledgements to prevent unnecessary latency in cases where a receiver's window size is 0. In other words, a device may send any pending message acknowledgments without waiting further for a message fragments on which the device might piggyback the acknowledgement. The device sends the pending message acknowledgments immediately regardless of whether the send acknowledgement timer is still ticking.

F. Keep Alive Messages

As previously discussed, in some embodiments, some messages 600 may be indicated as a keep alive message. Keep alive messages may be used to determine whether the remote BTP stack in a given connection has crashed or stopped. Alternatively, such determinations may use underlying technology of the relatively low power networks. Thus, keep alive messages ensure connectivity even when no application data is being sent or acknowledged, such as when the connection is idle at the message layer.

When the BTP stack stops its send acknowledgement timer and plays the BLE central (e.g., client 502) role in the corresponding connection, it starts a keep alive timer with a duration of one-half of the acknowledgement timeout interval. It restarts this timer when it sends any message fragment (including keep alive messages or other timer-driven acknowledgements) and the timer is already running. It stops this timer if it receives any message fragment with a sequence number. As the pending acknowledgement, this fragment generates temporarily removes the usefulness of explicit keep alive messages. If the send keep-alive timer expires, the stack sends a keep alive message, and the timer is restarted. As with regular payload-bearing message fragments, a lost keep-alive acknowledgement will cause the connection to be reset.

Keep-alive messages are BTP message fragments with a valid sequence number, but a null payload. Though they are acknowledged by the receiver, keep-alive messages are not passed up the stack from the BTP message reassembler to the next-higher layer, i.e. the higher-level protocol message layer. BTP keep alive messages thus do not interfere with the automatic closing of idle smart network connections based on the absence of message traffic.

As with regular payload-bearing message fragments, the BTP stack on the BLE central device will not send keep alive messages if the peripheral's receive window is full.

When the BTP stack stops its acknowledgement received timer and plays the BLE peripheral role (e.g., server 504) in the corresponding connection, it starts a keep alive received timer with a duration of the acknowledgement timeout interval. It restarts this timer whenever it receives any BTP message fragment. It stops this timer if it starts the acknowledgement received timer. If the keep alive received timer expires, the peripheral device resets the BTP connection.

IV. Advertisements

BLE Generic Access Profile (GAP) advertisements are used to signal the presence and status of BTP-enabled peripheral devices. To signal their presence, BTP-enabled BLE peripherals shall include in their advertising data a list of service UUIDs, in either its 16-bit or 128-bit representation. Centrals may filter BLE scan results by this UUID to return only BTP-enabled peripherals.

Figure 20:
FIG. 20 illustrates a transmission of an advertisement used to establish a BLE connection, according to an embodiment.

As illustrated in FIG. 20, when establishing a BLE connection between a first device 614 and a second device 615, one of the devices (e.g., device 614) sends out an advertisement 616 that indicates various details about the advertising device, any connected networks, and/or the potential BLE connection. Smart network devices advertise in a consistent format to use the limited advertisement data space. For example, the format may be restricted to 59 bytes with 28 designated to advertisements and 31 bytes designated for scan responses. The BLE advertisement may be used to indicate various details about the device, alarms, communication types, and/or networks to which the advertising device connects. For example, the BLE advertisement may distinguish the advertising device from other devices, include a human-readable name for the advertising device, indicate an alarming or non-alarming state for the advertising device, indicate an alarming state for a device connected to the advertising device, identify class of the advertising device, identify whether the advertising device is paired to an account, and/or identify various information about services (i.e., groups of characteristics) to be used in a BLE communication resulting from coupling to the advertising device.

Moreover, the advertisement may include indications of supported BLE services using UUIDs. For example, a general service UUID may be used to indicate that the device supports communication over a specific communication protocol (e.g., Weave). Additionally or alternatively, a critical event service UUID may be used to indicate that at a critical event (e.g., smoke detected) has occurred and should receive attention urgently. In some embodiments, these service indicators (e.g., UUID) may be the same size (e.g., 16 bits) or some other size.

A. General Format of BLE Communications

Figure 21:
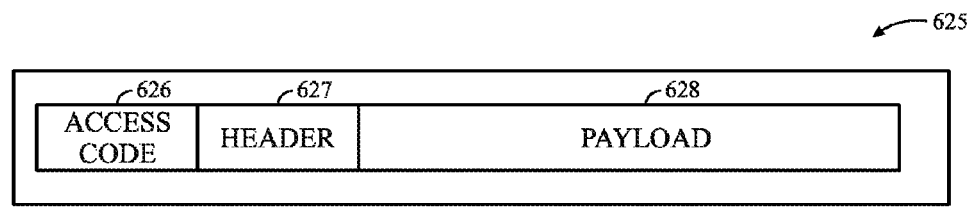
FIG. 21 illustrates a schematic allocation of a BLE data block including an access code, header, and payload, in accordance with an embodiment.

FIG. 21 illustrates a block format 625 that may be used to transmit BLE communications (e.g., advertisements). The block format may include an access code 626, a block header 627, and a payload 628. One or more of these fields may be omitted in some embodiments. The access code 626 may be used to synchronize communications, to identify direct current (DC) offset, to compensate DC current offset, to identify all data blocks exchanged on a physical channel, and/or to perform other suitable message tracking operations. The access code 626 may vary in length depending on whether the block header 627 or the payload 628 is present in a message. For example, the access code 626 may have a first length (e.g., 72 bits) when the block header 627 and the payload 628 are present and a second length (e.g., 68 bits) when the block header 627 and/or the payload 628 is missing. In some embodiments, the shorter access code 626 may be used in paging, inquiry, and/or park.

a. Access Code

Figure 22:
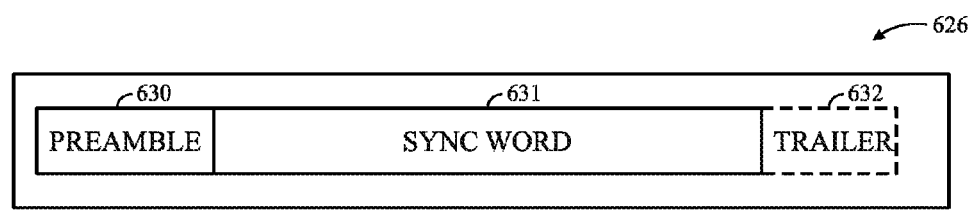
FIG. 22 illustrates a schematic allocation of the access code of FIG. 21, in accordance with an embodiment.

The access code 626 may have a format such as that illustrated in FIG. 22. In the illustrated embodiment, the access code 626 may include a preamble 630, a sync word 631, and a trailer 632. The preamble 630 is a fixed zero-one sequence of a number (e.g., 4) of symbols used to facilitate DC compensation. For example, in some embodiments, the sequence may be either '1010' or '0101' (in transmission order), depending on whether the least significant bit of the following sync word 631, if present, is 1 or 0, respectively. In some embodiments, a specific value for the preamble may be used for broadcasted advertisement messages.

The sync word 631 may be a code word of one size (e.g., 64 bits) derived from an address having a different size (e.g., 24 bit) that is constructed from address parts (e.g., upper or lower address parts) of the client or server or may be an at least partially fixed number. In some embodiments, the sync word 631 may be omitted.

The trailer 632, when present, is appended to the sync word 631 when the block header 627 follows the access code 626. The trailer 632 is a fixed zero-one sequence of four symbols. The trailer 632 together with the three most significant bits of the sync word 631 form a 7-bit pattern of alternating ones and zeroes which can be used for extended DC compensation. In other words, the trailer 632 has a sequence of either '1010' or '0101'(in transmission order) depending on whether the most significant bit of the sync word is 0 or 1, respectively.

b. Header

Figure 23:
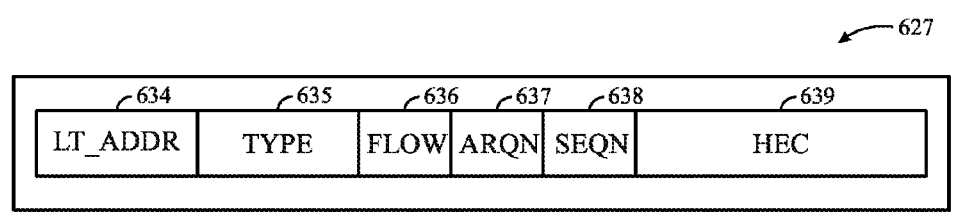
FIG. 23 illustrates a schematic allocation of the header of FIG. 21, in accordance with an embodiment.

FIG. 23 illustrates an embodiment of the header 627. As illustrated, the header 627 may include a logical transport address (LT_ADDR) 634, a type code 635, a flow control 636, an acknowledgment indication 637, a sequence number 638, and a header error check (HEC) 639. The LT_ADDR 634 is a field contains the logical transport address for the block. This field indicates a destination client (or clients in the case of an advertisement broadcast) for a block in a server-to-client transmission slot. In some embodiments, this logical transport address may be fixed for connection-less broadcasts (e.g., (0x8E89BED6).

The type code 635 indicates what type of block is being used and may be interpreted based on the LT_ADDR 634 (e.g., connectionless broadcast or advertisement). The type code 635 may also indicate a number of slots that the block will occupy to enable receivers to refrain from listening during the remaining duration of the indicated slots.

The flow control 636 is used for flow control of packets and is used only for certain transport types. When a receiver buffer of one of the transport types in the recipient is full, a STOP indication (FLOW=0) is returned to stop the other device from transmitting data temporarily. When the receiver buffer can accept data, a GO indication (FLOW=1) is returned. When no packet is received or the received header is in error, a GO is assumed implicitly. In this case, the client can receive a new packet with Cyclic Redundancy Checking (CRC) even though its receiver buffer is still not empty. The client then returns a Not Acknowledged message in response to this packet even if the packet passed the CRC check. The flow control 636 when unused may be set to a specific number (e.g., 1 or 0) and ignored upon receipt.

The acknowledgment indication 637 is used to indicate a source of a successful transfer of payload data with CRC. The acknowledgment indication 637 may be positively acknowledged with a first value (e.g., 1) or indicated as not acknowledged with a second value (e.g., 0). This bit may be ignored for some transport types and set to specific value (e.g., 0 or 1) on transmission and ignored upon receipt.

The sequence number 638 provides a sequential numbering scheme to order the data packet stream. For some broadcast blocks, a modified sequencing method may be omitted or ignored, instead relying on the sequence numbers 610 discussed previously. The HEC 639 may include address parts from the client and/or server to verify that the proper packed has been delivered using the access code 626.

c. Payload

Figure 24:
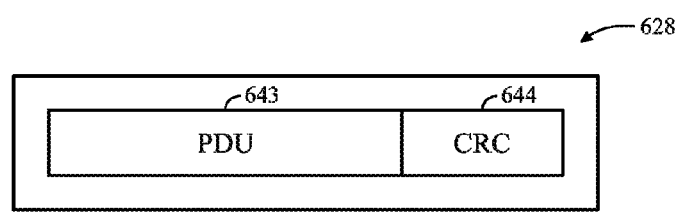
FIG. 24 illustrates a schematic allocation of the payload of FIG. 21, in accordance with an embodiment.

FIG. 24 illustrates an embodiment of the payload 628 that includes a protocol data unit (PDU) 643 and CRC 644. The PDU 643 may include payload data to be transmitted/received in a specific format. For example, the PDU 643 may be formatted similar to the blocks 595, 601, or 607. Additionally or alternatively, the PDU 643 may be formatted similar to the advertisement payloads as discussed below depending on the type code 635. Furthermore, the length of the payload may be set by the payload type, by a payload length included in payload headers located in the payload 628, and/or by a maximum transfer unit (MTU) of the sending or receiving device.

The CRC 644 is a data integrity check that may be optionally included in the payload 628 or added to the end of payload 628 to ensure that the data sent in the payload 628 is valid. In some embodiments, the CRC 644 may be derived from each octet of the header 627 and the payload 628.

B. General Service

A general service may be included that indicates that data communication may occur over a specific protocol (e.g., Weave). By including an indication that the advertising device supports this service, the advertising device and another remote device may communicate over BLE using the GATT structure, as previously discussed.

As previously discussed, the advertisement data may include the general service UUID. In addition to the general service UUID, metadata may be associated with this service. In certain embodiments, the advertisement may contain identification information for the device. Additionally or alternatively, some embodiments may hide at least some of the identification information using an authentication token. For example, the advertisement may be hidden/encrypted for a mobile authentication device that may physically move within Bluetooth range of devices that should not connect to the mobile authentication device nor share information about the mobile authentication device. The advertisement can indicate which types of information are included. Accordingly, the advertisement including the general service may include a service data field that identifies types of weave data used. For example, in this field, a first value (e.g., 0x01) indicates that device information is included in the advertisement, and a second value (e.g., 0x02) indicates that an authentication token is included without explicit recitations of device information. In some embodiments, a hybrid communication type may be included that shares some information, but hides other information. Moreover, in some embodiments, other suitable data block types may be encoded into this field.

When the BLE advertisement includes device information, the advertisement may include fields similar to those represented in Table 2 below.

TABLE 2

Device information

| Field | Description | Size (Octets) |
|---|---|---|
| Data Version (e.g., version 0.1) | Indicates major (e.g., 0) and minor version (e.g., 1) of this metadata. | 2 |
| Device Class | Classifies the device by vendor/manufacturer, product, etc. | 4 |
| Device ID | Populated with an identifier that identifies the device within the smart network. | 8 |
| Account Pairing Status | Indicates whether or not device is paired to an account. | 1 |

Although Table 2 includes indications of octet size for each field in the device information, some embodiments may increase or decrease these sizes based on implementation requirements. The device class may include a vendor identifier (ID) that identifies a manufacturer or vendor of the device. The device class may also include a product identifier that identifies a specific device type provided by the vendor. The device ID may be an identifier used to identify the device in the smart network. For example, the device ID may be a node ID for the device in the smart network. The account pairing status indicates whether the device is paired to an account on a remote service. In some embodiments, some actions (e.g., hushes of alarms) are restricted to devices that are paired to an account on the remote service. In other words, in such embodiments, hazard detectors that are not paired to the remote service cannot be hushed. Furthermore, in some embodiments, only hushing devices that have access to the account to which the hazard detector is paired. For example, when the hazard detector is paired to the remote service, a hush key is generated by the service that is passed to the hushing device (e.g., cellular phone) when the hushing device accesses the paired account on the remote service. The hazard detector will not accept hush commands without this hush key. Moreover, this hush key may be common to any devices that are paired to or have access to a common account on the remote service.

In advertisements that include an authentication token, the payload may be at least partially encrypted. In some embodiments, version numbering may be unencrypted to provide an indication how to decrypt the advertisement to an authorized device receiving the encrypted advertisement. In other embodiments, the version numbering may be encrypted either with the remainder of the advertisement or in its own encryption envelope that is decrypted consistently between authentication token versions.

C. Critical Event Service

In the event that there is an alarm/event indicating urgency on the device, the advertisement may include details for the accompanying critical event service in addition to or in place of the general service. In this case, the advertisement would include an indication that the critical event service in the list of UUIDs supported and event-specific information categorizing the critical event.

In a state where the nest device conveys a critical event, it does so by utilizing this field of the advertisement. In some scenarios, there may be multiple critical events at the same time.

Multiple critical events can be conveyed in a single advertisement using a format similar to that shown in Table 3 below.

TABLE 3

Multiple Critical Events in a Single Advertisement

| Field | Size (Octets) |
|---|---|
| 16 bit service UUID for the critical event service | 2 |
| Data length for $1^{st}$ critical event | 1 |
| Critical event type for $1^{st}$ critical event | 1 |
| Data for $1^{st}$ critical event | Variable (but fixed by type) |
| Data length for $2^{nd}$ critical event | 1 |
| Critical event type for $2^{nd}$ critical event | 1 |
| Data for $2^{nd}$ critical event | Variable (but fixed by type) |

Although Table 3 includes example data lengths, some embodiments may vary length of the various fields. Furthermore, the critical event type may indicate a type of alarm being sent. In some embodiments, this critical event type may indicate what type of device originated the critical event. For example, an alarm (e.g., smoke alarm, CO alarm, heat alarm, etc.) from a hazard detector may be classified as a single critical event type. Each event type may have a defined length of octets that corresponds and will follow the event type field in the advertisement.

Table 4 below represents a possible example of the event type-specific that may follow the event type field. Again, the below table includes a possible length for each field, but some embodiments may have different field sizes and/or vary the field size between implementations.

TABLE 4

Critical event service data

| Field | Size(Octets) | Remarks |
|---|---|---|
| Class event version | 1 | Version number |
| Alarm challenge | 4 | Alarm challenge data |
| Number of alarm events | 1 | Number of alarms in this type |
| $1^{st}$ alarm information | 1 | Higher nibble has alarm type Lower nibble has alarm state |
| $2^{nd}$ alarm information | 1 | Higher nibble has alarm type Lower nibble has alarm state |

The class event version indicates to which general class the critical event belongs. For example, the class event may be a hazard detected (e.g., smoke, fire, CO, etc.), a security alarm, an irrigation problem, and/or other suitable event types that may be alerted in the smart network. The alarm challenge is used to ensure that any hush requests are timely.

The alarm information includes a higher nibble that indicates an alarm type specific to the class event. For example, in alarms that arise from a hazard detected, the higher nibble of the alarm information indicating alarm type may be chosen from the values in Table 5 below:

TABLE 5

Alarm types

| Value | Name | Comments |
|---|---|---|
| 0x10 | ALARM_SMOKE | Alarm triggered by a smoke sensor |
| 0x20 | ALARM_TEMP | Alarm triggered by a temperature sensor |
| 0x30 | ALARM_CO | Alarm triggered by a CO sensor |
| 0x40 | ALARM_CH4 | Alarm triggered by a natural gas sensor |
| 0x50 | ALARM_HUMIDITY | Alarm triggered by a humidity sensor |
| 0x60 | ALARM_SECURITY | Security Alarm |
| 0x70 . . . 0xe0 | | Reserved for future use |
| 0xf0 | ALARM_OTHER | Other alarm condition not called out here. Check metadata for the specific alarm source. |

The lower nibble indicates a state for the alarm that may be chosen from the values in Table 6 below:

TABLE 6

Alarm states

| Value | Name | Comments |
|---|---|---|
| 0x00 | STATE_STANDBY | Everything is OK. Originating node will send this to indicate an "all clear" for the specific alarm source |
| 0x01 | STATE_HEAD_UP_1 | Pre-alarm state - lower magnitude of alert |
| 0x02 | STATE_HEAD_UP_2 | Pre-alarm state - higher magnitude of alert |
| 0x03 | STATE_HU_HUSH | Pre-alarm state |
| 0x04 | STATE_ALARM_HUSHABLE | Alarm state, the originating or remote node may locally hush the alarm |
| 0x05 | STATE_ALARM_NONHUSHABLE | Originating alarms may not be hushed, but remote alarms may hush |
| 0x06 | STATE_ALARM_GLOBAL_HUSH | Alarm hush: the originating and the remote nodes are in the hush state |
| 0x07 | STATE_ALARM_REMOTE_HUSH | Global hush: the originating node is alarming and the remote nodes are hushed |
| 0x08 | STATE_SELFTEST | Self-test of the senor alarm |

D. Additional Information in the Advertisement

Additionally or alternatively to the service UUIDs and related information, some embodiments may include a human-readable name for the device. For example, in some embodiments, the human-readable name may be optional with a length up to a limit (e.g., 4 bytes) indicating the name of the device. For example, the human-readable name may include a binary value for the text "d2." The advertisement may also include additional manufacturer specific data in a manufacturer specific header (MSH). The MSH may include an AD type that that indicates advertisement data specific to the manufacturer. In some embodiments, this data may be allocated 1 byte (e.g., 0xFF). The MSH may also include a manufacturer identifier code. In some embodiments, this identifier may have a predetermined length (e.g., 2 bytes). In some embodiments, this information may be taken from the vendor ID previously discussed.

E. Splitting Data

In some embodiments, the data to be included in the advertisement cannot be included in a single advertisement packet due to size constraints or other constraints. In such scenarios, the data to be advertised may be split between an advertisement packet and a scan response packet, both of which are relayed to the scanning device. Based on the operating system of the central device, these packets might be reported as separate events but then correlated in the scanning device. Based on splitting of data, critical information may be prioritized and included in the advertisement packet, which is sent before the scan response packet. The scan response packet may be provided later (e.g., in response to a scan request from the scanning device).

When the application (i.e. Weave message layer) sends a message over a BTP connection, that message shall be split into ordered, non-overlapping fragments such that the set of all fragments may be reassembled into the original message. Each fragment is prepended with a BTP packet header and sent as the payload of a single GATT operation. If a message is split into more than one fragment, fragments are sent in order of their position in the original message packet, starting with the fragment at the message's head.

At any point in time, only one message may be transmitted in each direction over a BTP connection. The transmission of fragments of any two messages may not overlap. If the application attempts to send one message while transmission of another message is in progress, the new message shall be appended to a first-in, first-out queue. The next message will be popped off this queue and transmitted once transmission of the current message is completed.

As discussed below, the BTP packet which contains the first fragment of a message sent over a BTP connection has a Start Message header flag set to indicate the beginning of a new message. The presence of this flag indicates the further presence of a 16-bit unsigned integer field which provides the receiver with the total length of the fragmented message. Any BTP packet which does not have its Start Message flag set and contains a message fragment includes a Continue Message flag. The last BTP packet for a given message has an End Message flag set to indicate the end of the transmitted message. A BTP packet which bears an unfragmented message, i.e. a message small enough to fit into a single fragment, has both its Start Message and End Message flags set.

The size of a single message sent via BTP is limited to some length (e.g., 64 KB or. The maximum size of the 16-bit unsigned integer length field in the BTP packet header). The number of fragments used to send a message is unlimited, and delimited by the Start Message and End Message bits in the BTP packet header.

The length of the fragment data payload in each BTP packet whose End Message bit is not set is equal to the connection's maximum BTP packet size minus the size of that packet's header. If a packet's End Message bit is set, the length of its fragment data payload may be equal the size of the original message minus the total size of all previously transmitted fragments of that message. In this way, the length of a message's last fragment is implied by its size.

Once a peer receives a complete set of fragments, the peer reassembles the fragments in the order received and verifies that the reassembled message's total length matches that specified by the Start Message fragment's length value. If the length matches, the receiver passes the reassembled message up to the next-higher-layer application. If the reassembled message's length does not match that specified by the sender, or an End Message packet's fragment payload size would exceed the maximum BTP packet size, the receiver closes the BTP connection and reports an error to the application.

If a peer receives an End Message fragment without the presence of a previous Start Message fragment, or a Start Message fragment when another message's transmission is already in progress, the receiver closes the BTP connection and report an error to the application.

Figure 25:
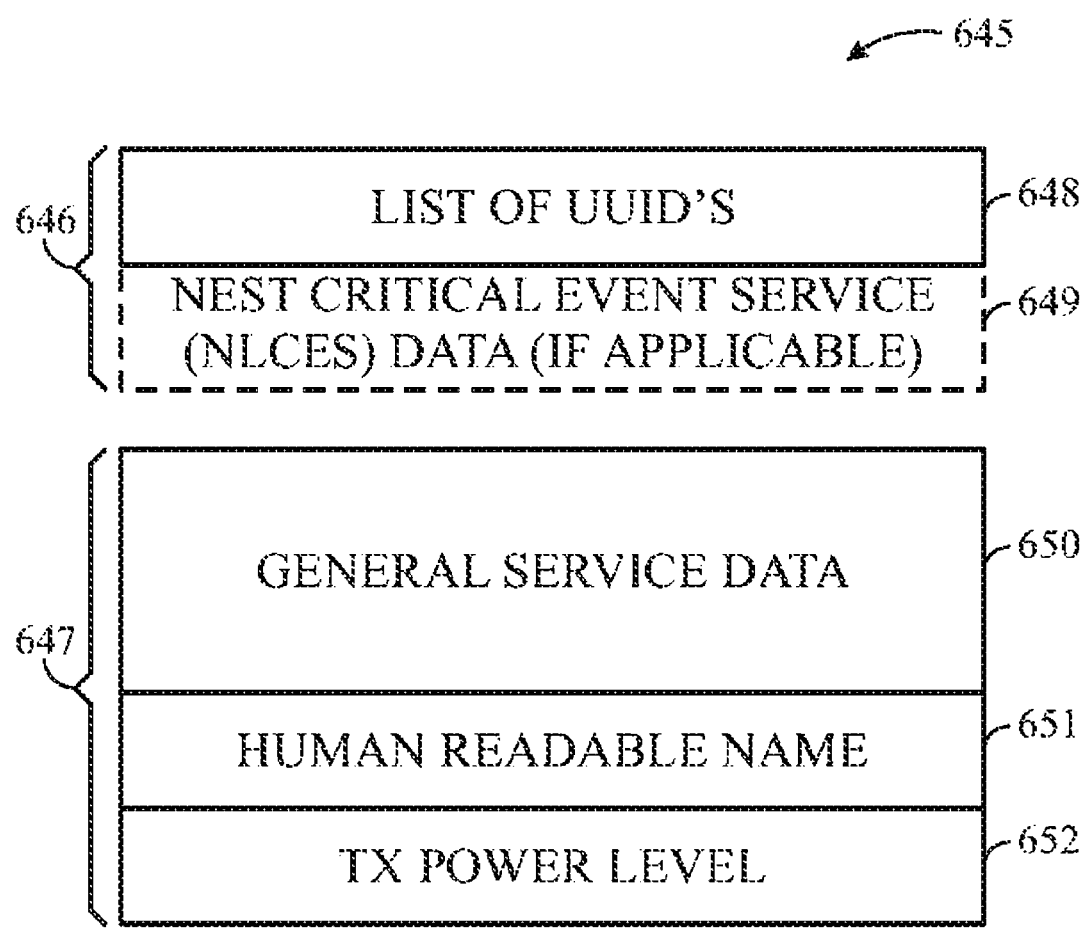
FIG. 25 illustrates a schematic allocation of the advertisement of FIG. 20 into a main advertisement packet and a scan response packet, according to an embodiment.

FIG. 25 illustrates an embodiment of an advertisement 645 divided into an advertisement packet 646 and the scan response packet 647. As illustrated, the advertisement packet 646 includes a list of UUIDs for the available services 648, such as the general service and the critical event service. Also, if a critical event has occurred and/or is occurring, the advertisement packet 646 includes critical service data 649.

Data that is less time-critical may be included in the scan response packet 647 that may be sent along with the advertisement packet 646 and/or later (e.g., in response to a scan request). For instance, the scan response packet 647 may include general service data 650, a human-readable name 651, and/or a transmission power level 652. The general service data 650 and human-readable name 651 may conform to the example structures previously discussed. The transmission power level 652 may indicate at what level (e.g., in dBs) the communications are to occur. In some embodiments, this transmission power level may be used to determine how far the advertisement is received from the broadcasting device.

F. Advertisement Examples

1. Non-Alarming Device Example

Figure 26:
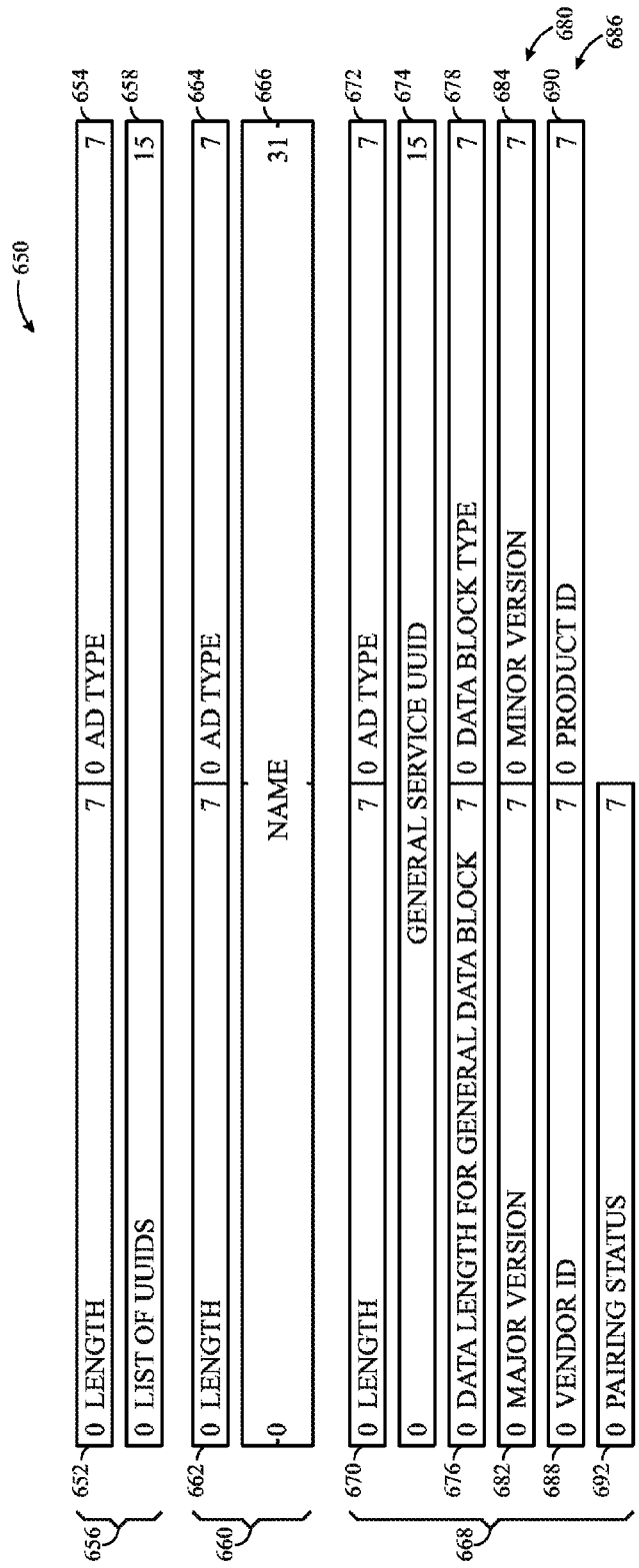
FIG. 26 illustrates the advertisement of FIG. 20 when the electronic device is not alarming, according to an embodiment.

FIG. 26 illustrates an embodiment of an advertisement 650 that may be sent by a device over BLE. In some embodiments, sizes and order of the various fields may vary. Moreover, in some embodiments, some of the fields may be omitted from at least some transmissions of the advertisement. In certain embodiments, the advertisement 650 includes a length field 652 that indicates a length of the overall advertisement. The advertisement 650 also includes an AD type field 654 that indicates what type of data is included in one or more following fields and/or what type of data is referred to by the length field 652. In some embodiments, when the AD type field 654 has a value (e.g., 0x02) that indicates that the length field 652 pertains to a metadata header 656 that includes the length field 652, the AD type field 654, and a List of UUIDs 658. In some embodiments, the length field indicates the length of the data chunk (e.g., metadata header 656) to which the length field 652 and the AD type field 654 pertain. Moreover, in some embodiments, the length may indicate a length of the remaining fields of the data chunk. For example, in such embodiments and where the fields have lengths corresponding to those illustrated in FIG. 27, the length field may have a value of 3 that indicates that the list of UUIDs 658 and the AD type field B4 have a total length of 3 bytes.

In some embodiments, the advertisement 650 may include a human-readable name data chunk 660. In some embodiments, this human-readable name data chunk 660 provides a short human-readable name for the device transmitting the advertisement 650 that may be used for providing a short identification for the device for use in testing, diagnostics, and/or other suitable situations. In certain situations, some advertisements from a single device and/or in a single network may include the human-readable name data chunk 660 while other messages and/or devices in the network may be sent without the human-readable name data chunk 660. In advertisements (e.g., the advertisement 650) that include the human-readable name data chunk 660, the human-readable name data chunk 660 includes a length field 662, an AD type field 664, and a name field 666. The length field 662 indicates a length of the human-readable name data chunk 660. The AD type field 664 includes a value (e.g., 0x16) that indicates that the data chink is the human-readable name data chunk 660 that informs a receiving device how to interpret the human-readable name data chunk 660. The name field 666 includes a string of characters that may be used to identify the sending device in a human-readable format (e.g., "t2"). In some embodiments, the string may be represented in UTF-8 or some other suitable character encoding.

The advertisement 650 also includes a general service data chunk 668. The general service data chunk 668 includes a length field 670 that identifies a length of the general service data chunk 668 and an Ad type field 672 that includes a value (e.g., 0x16) that indicates that the general service data chunk 668 is of the general service type. The general service data chunk 668 also includes a general service UUID 674 for the general service. In some embodiments, the general service data chunk 668 also includes a data block length field 676 for network/device data included in the advertisement. In other words, the data block length field 676 indicates a length of the general service data chunk 668 other than the general service UUID 674 and related whole chunk metadata fields (e.g., length field 670 and AD type field 672). In some embodiments, the data block length field 676 may be omitted because the fields of the general service data chunk 668 whose length are not included in the data block length field 676 may be consistent in size between advertisements.

The general service data chunk 668 may also include a data block type field 678 that identifies the data block length field 676 (when present) and the following data as data related to the device and/or its connected network(s).

The general service data chunk 668 also includes version information 680 that indicates a version of encoding that informs a device receiving the advertisement 650 how to interpret the advertisement 650. In some embodiments, the version information 680 includes a major version field 682 and a minor version field 684. The major version field 682 may include a value (e.g., 1) that is incremented when substantial updates are made to the advertisement 650 format, and the minor version field 684 may include a value (e.g., 2) that is incremented when less substantial updates are made to the advertisement 650 format. The values for the major version field 682 and the minor version field 684 may be combined to form a complete indication (e.g., v. 1.2) of the version. In some embodiments, these values may be any value that may be expressed using the available bytes. For example, if each version field is a byte, each version field may contain values from 0 to 255 before cycling.

The general service data chunk 668 also includes a device identifier (ID) field 686 that may be used to identify the device within the smart network. The general service data chunk 668 also includes a device class identification 686. The device class information may include two subfields: a vendor ID field 688 and a product ID 690. The vendor ID field 688 indicates a vendor for the device, and the product ID 690 indicates the device type of the device specific to the vendor. The general service data chunk 668 also includes a service pairing status 692, as previously discussed.

As previously discussed, in some embodiments, the advertisement 650 may be split into two or more packets: an advertisement packet and a scan response packet. In embodiments where the advertisement 650 is split into two packets; the length field 652, the AD type field 654, the list of UUIDs B4 form the advertisement packet with the human-readable name data chunk 660. In embodiments that employ the field lengths of the illustrated embodiment of the advertisement 650, this advertisement packet would have a size of 10 bytes. In such embodiments, the scan response packet would consist of the general service data chunk and have a size of 21 bytes.

2. Alarming Device Example

Figure 27:
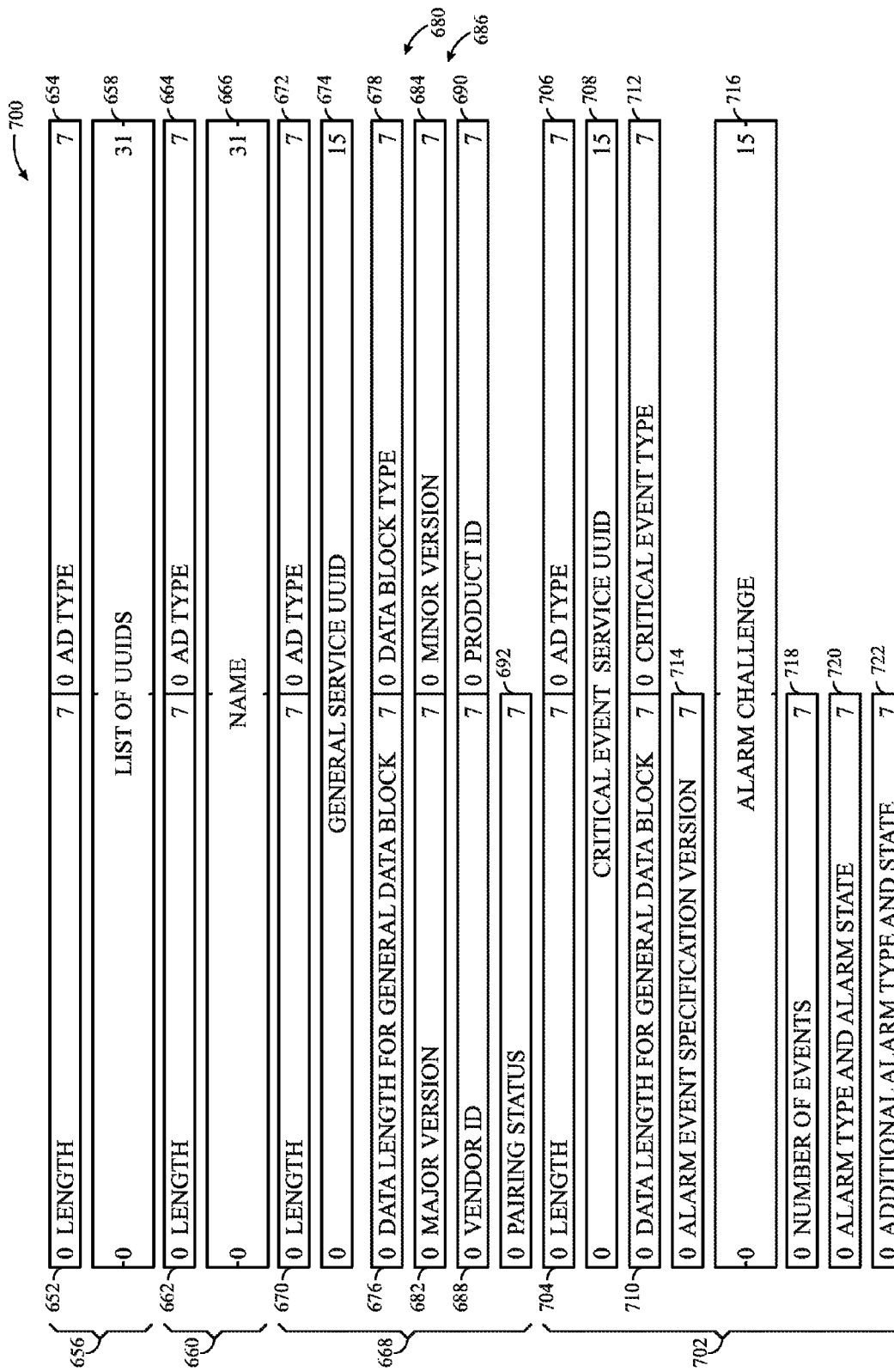
FIG. 27 illustrates the advertisement of FIG. 20 when the electronic device is alarming, according to an embodiment.

FIG. 27 illustrates an embodiment of an advertisement 700. The advertisement 700 includes all the fields of the advertisement 650, but the advertisement 700 includes a critical event data chunk 702 that indicates that the advertising device is in an alarming state. Furthermore, when the advertisement 700 includes the general service data chunk 668 and the critical event data chunk 702, the List of UUIDs 658 may be longer in the advertisement 700 than the advertisement 650. The critical event data chunk 702 includes a length field 704 that indicates a length for the critical event data chunk 702. The critical event data chunk 702 also includes an AD type field 706 with a value (e.g., 0x16) that identifies the critical event data chunk 702 as a critical event data chunk. The critical event data chunk 702 also includes a critical service UUID 708 that contains the UUID for the critical service.

Also, in some embodiments, the critical event data chunk 702 also includes a critical event (CE) data block length field 710 for critical event data included in the advertisement. In other words, the CE block length field 710 indicates a length of the critical event data chunk 710 other than the chunk metadata fields (e.g., length field 704 and AD type field 706). In some embodiments, the CE data block length field 710 may be omitted because the fields of the critical event data chunk 702 whose length are not included in the CE data block length field 710 may be consistent in size between advertisements. The critical event data chunk 702 also includes a critical event type 712 that indicates a type of critical event (e.g., an alarm event from a hazard detector, a security event, etc.)

The critical event data chunk 702 also includes an alarm event specification version 714 that indicates how the critical event data chunk 702 data should be interpreted. The critical event data chunk 702 also includes an alarm challenge 716 that includes a challenge code for the alarm related to the critical event. The challenge code is used to verify that any received hushes are timely by verifying that the received hush is substantially contemporaneous to the critical event. The challenge code may be a random value generated at the time of the alarm having a relatively small size such as 4-8 octets of data. The receiving device then pulls this code from the advertisement 700 and includes the challenge code in a related hush message. For example, the hush message may be signed using the hush key over the challenge value (i.e., the challenge value is signed using the hush key). When the alarming device determines that the challenge code and the hush key are proper. Then the alarming device sends a response message indicating that the alarm is alarm, an error occurred, or the alarm is unhushable, or some other suitable status.

The critical event data chunk 702 also includes a number of events field 718 that indicates how many critical events are included in the critical event data chunk 702. The critical event data chunk 702 also includes an alarm type and alarm state field 720 that indicates a sub-type of alarm specific to the type of alarm indicated in the critical event type 712. When the number of events field 718 indicates that more than a single event is included in the critical event data chunk 702, the critical event data chunk 702 includes an additional alarm type and state field 722 for each additional critical event included.

The alarm type and alarm state field 720 and the additional alarm type and state 722 (when included) may include values similar to those provided in Tables 5 and 6 above.

In embodiments where the advertisement 700 is split, the length field 652, the AD type field 654, the list of UUIDs B4, the human-readable name data chunk 660, and the critical event data chunk 702. In embodiments that employ the field lengths of the illustrated embodiment of the advertisement 700, the advertisement packet would have a size of 26 bytes, and the scan response packet would consist of the general service data chunk and have a size of 21 bytes.

V. Hushing using BLE

Figure 28:
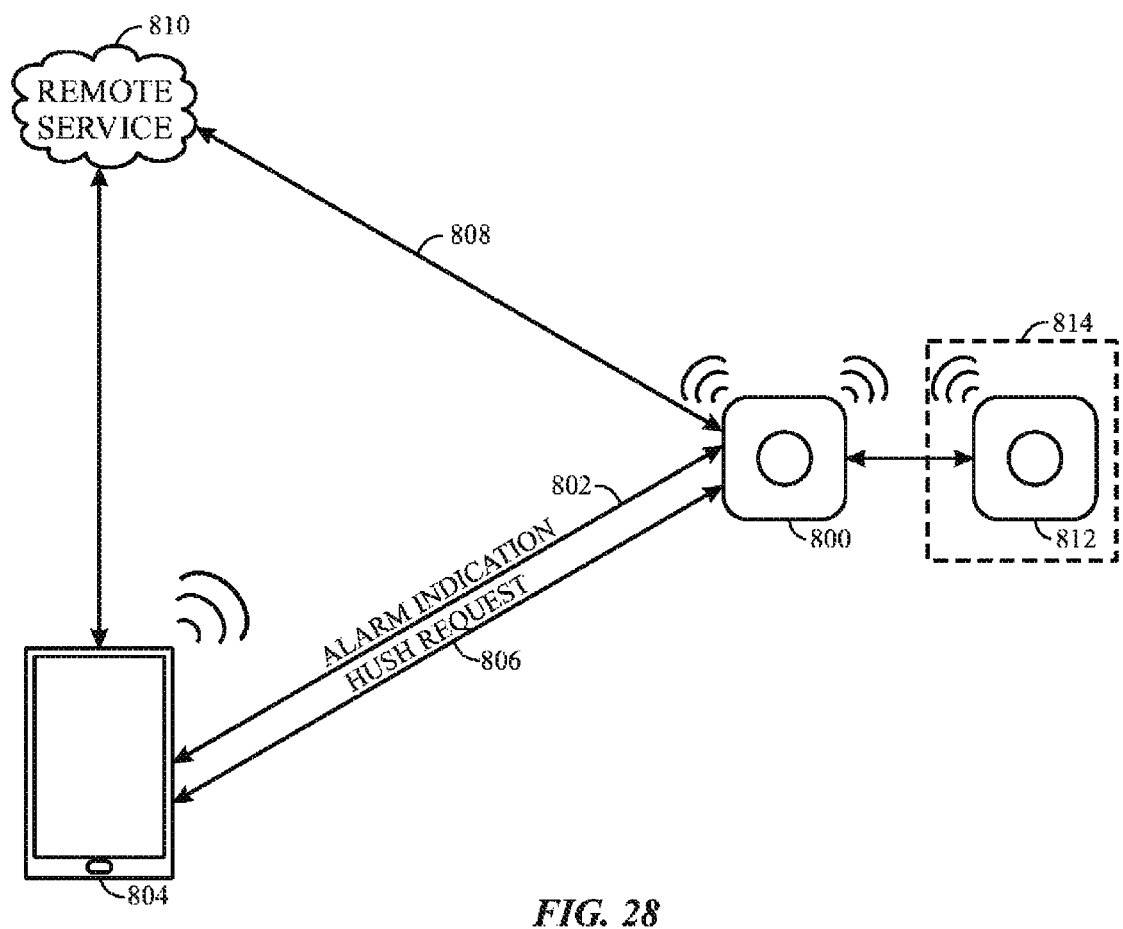
FIG. 28 illustrates a smart device hushing an alarm using remote hushing over a relatively low power communication type, according to an embodiment.

As previously discussed, the smart devices in the smart network include various sensors that track real-world conditions around the smart devices. For example, the smart devices may include hazard detection, security devices, and/or other monitoring devices that alert building occupants of various situations. These devices may alarm upon detection of a critical event. For example, as illustrated in FIG. 28, a smart device 800 sends an alarm indication 802 to an electronic device 804. In some embodiments, the electronic device 804 may include a cellular phone, tablet computer, laptop computer, a desktop computer, or any other electronic device capable of receiving the alarm indication 802 and transmitting the hush request 806. The alarm indication 802 may be a relatively low wireless signal, such as a BLE advertisement. The smart device may also provide sonic or visual indicators to indicate that the detected event. However, in some embodiments, when the event is observed by an occupant who is aware of the event, the event is a false alarm, and/or other scenarios where the alarm is no longer useful in alerting the event, the alarm may be hushed using a hush request from the electronic device 804.

In some embodiments, hushing may be limited to devices within a predetermined proximity to the smart device 800 to ensure that an attempt has been made to investigate the cause or source of the alarm. Furthermore, as discussed below, the hush response includes some security features that ensure that only authorized individuals have the ability to hush the alarm. In some embodiments, the wireless hushing enables hushing an alarm at the smart device 800 without actually physically touching the smart device 800 without compromising on security or safety monitored by the smart device 800. In some embodiments, the proximity verification may be prepared via a network-connected camera through which the electronic device 804 may be used to verify a condition causing the critical event.

In some embodiments, an alarm indication 808 may also be sent to a remote service 810 then relayed to the electronic device 804. Additionally or alternatively, the remote service 810 may be replaced with an access point or router for a wireless network.

Furthermore, the smart device 800 may propagate the alarm and hushes to other devices 812 (e.g., hazard detectors, thermometers, etc.) in a network 814. The network 814 may include a different wireless communication type (e.g., 802.15.4) than is used by the hush interaction between the smart device 800 and the electronic device 804 (e.g., BLE).

In certain embodiments, as discussed below, when the alarm indication 808 is received via the remote service 810 before an alarm indication 802 is received. The electronic device 804 may display a notification of the alarm along with a notification that hushing is not enabled via the remote service 810. In other embodiments, hushing may be enabled through the remote service 810 (or an access point or router) when proximity to the smart device 800 can be verified through another path. For example, if the electronic device 804 detects an electromagnetic, sonic, or visual signal from the smart device 800. In some embodiments, certain alarm types may be unhushable without proximity verification while other alarm types are hushable regardless of proximity verification. For example, in certain embodiments, a smoke alarm may be unhushable from remote connections, but a security alarm may be hushed remotely because the remote user is aware of a condition that would cause a security alarm, such as a visitor without a security system password or a scheduled action by an automated electronic device (e.g., vacuuming robot). In some embodiments, hushability of an alarm may vary based on severity of an alarm. For example, if the alarm is a lower priority "heads-up" alert, the alarm may be hushed, but if the alarm indicates an actual critical event the alarm may not be hushed.

In some embodiments, when a hush attempt is made on an unhushable alarm, the alarm may not be hushed, but remote devices that are alarming may be hushed. In other words, if a smoke alarm originates in the attic, a smart device in the basement may transmit notifications (e.g., audio and/or visual indicators) of the alarm in the attic. When a hush attempt is made to hush the unhushable alarm in the attic, the smart device in the basement may be hushed and cease transmitting notifications of the alarm.

In some embodiments, a connection to the smart device may be authenticated by using a program application on the electronic device 804 that is used to login to the remote service 810. In some embodiments, when the electronic device 804 receives the alarm indication 802, the electronic device 804 may withhold a silencing option from a user interface (UI) if the electronic device 804 is not logged into the remote service 810 as an authenticated user for an account that is used to manage the smart device. Additionally or alternatively, the smart device 800 may block connection to the electronic device 804 until the electronic device 804 is authenticated for an account used to manage the smart device 800.

Figure 29:
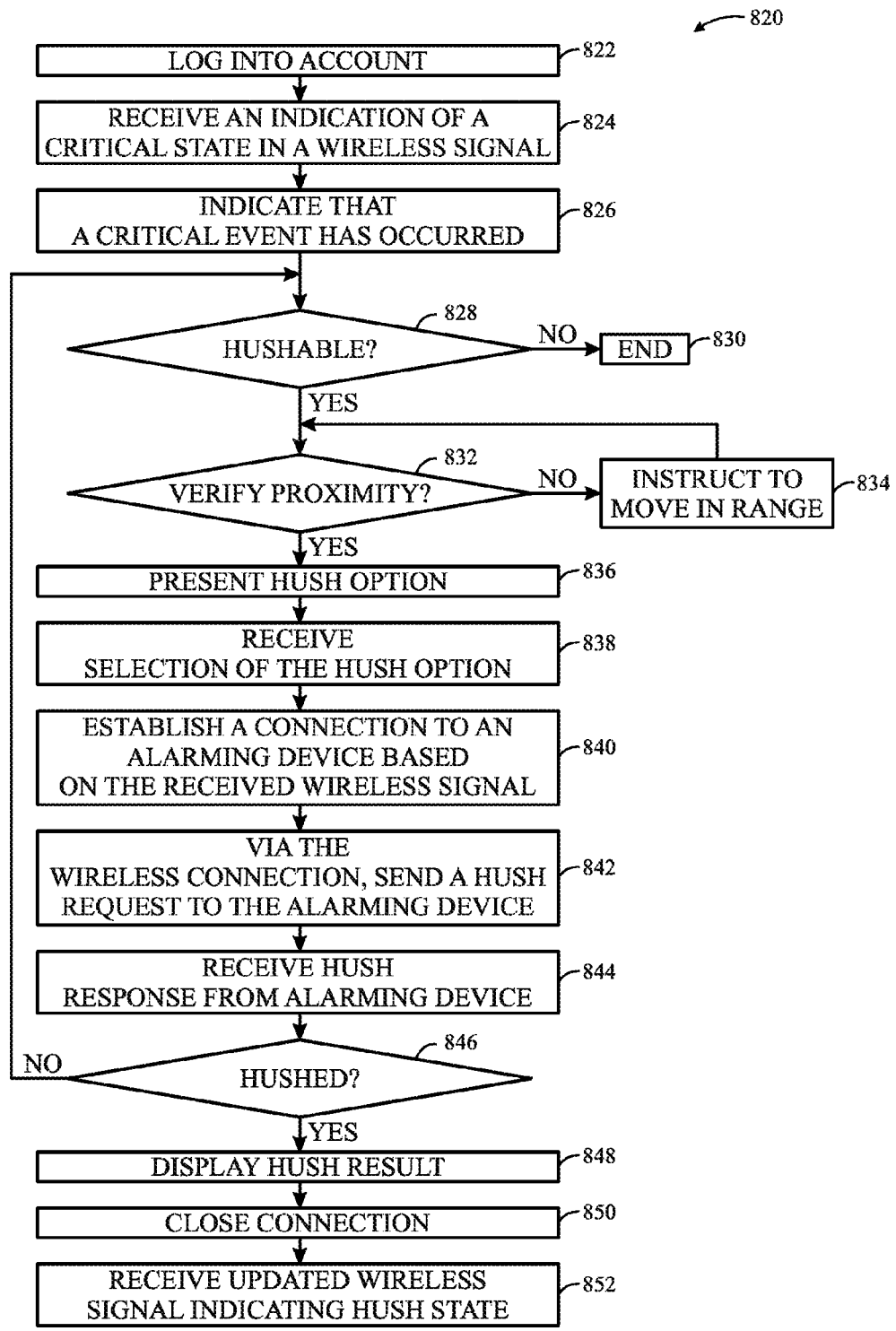
FIG. 29 illustrates a flowchart view of a process for hushing an alarm, according to an embodiment.

FIG. 29 illustrates a flow chart diagram of a hushing process 820 that may occur at the electronic device 804. The electronic device 804 logs into the remote service 810 using an account name and password that corresponds to the smart device 800 (block 822). By logging into the account, the electronic device 804 may authenticate to the smart device 800. For example, in some embodiments, the remote service 810 may provide the electronic device 804 with a signature or a key to generate a signature that may be used to authenticate to any alarming devices to which the account pertains. In some embodiments, the signature may be generated from the account password.

The electronic device 804 receives an indication of a critical state in the smart device in a wireless signal 802 (block 824). For example, if the electronic device 804 receives a BLE advertisement that includes the critical service, the electronic device 804 can determine that the advertisement is an indication of a critical state for the smart device 800. Additionally or alternatively, the electronic device 804 may receive the indication via the remote service 810 via one or more networks, such as 802.11 or 802.15.4 networks. Furthermore, in some embodiments, the electronic device 804 receives the indication only when an application program is active or running the background that causes the electronic device 804 to scan for the wireless signal 802. Thus, in such embodiments, the electronic device 804 may save on power consumption when the electronic device 804 is not readied to hush the smart device 800.

In response to receiving the indication, the electronic device 804 displays an indication that a critical event has occurred (block 826). The displayed screen may vary based on various information about the indication. For example, the electronic device 804 may determine whether the alarm is hushable (block 828). For example, alarms surpassing a threshold of severity and/or alarms that have been hushed more than a threshold number of hushes. In some embodiments, hushability and/or factors that cause unhushability may be included in the BLE advertisement. For example, an advertised alarm state in the BLE advertisement may include an indication of an unhushable alarm. If the alarm is not hushable, the electronic device 804 may terminate the hush process even though the displayed indication may continue being displayed by the electronic device 804 (block 830). Moreover, the displayed indication may vary based on the termination of the hush process. For example, a hush option may be completely missing from the displayed indication when the alarm is not hushable.

If the electronic device 804 does not determine that the alarm is unhushable, the electronic device 804 determines whether the electronic device 804 is proximal to the smart device 800 (block 832). For example, in some embodiments, if the electronic device 804 has received the indication via BLE, the electronic device 804 may determine that the smart device 800 is within a distance within a proximity threshold. Additionally or alternatively, the smart device 800 may transmit an sonic and/or optical signal that may be used by the electronic device 804 (or the smart device 800) to verify proximity between the electronic device 804 and the smart device. For example, in such embodiments, the smart device 800 may broadcast an ultrasonic signal that the electronic device 804 reproduces in communication with the smart device 800. If proximity is confirmed, the electronic device 804 presents a hush option (block 836). If the electronic device does not detect the broadcasted sonic signal or the smart device 800 responds that a hush request is rejected based on proximity, the electronic device may determine that the electronic device 804 is not close enough to the smart device 800 for hushing. In some embodiments, the electronic device 804 may present a different screen when proximity is not confirmed. For example, the hush option may be grayed-out as a notification that the electronic device 804 should be moved closer to the smart device 800 before hushing the smart device 800. In some embodiments, the instructions may indicate that the electronic device 804 (and the user) should move closer to a detected event before enabling hushing of the alarm. For example, the electronic device 800 may request the user to enter a room (e.g., living room) to corresponding to the event causing the alarm to allow the user to physically inspect the event before hushing the alarm.

Figure 30:
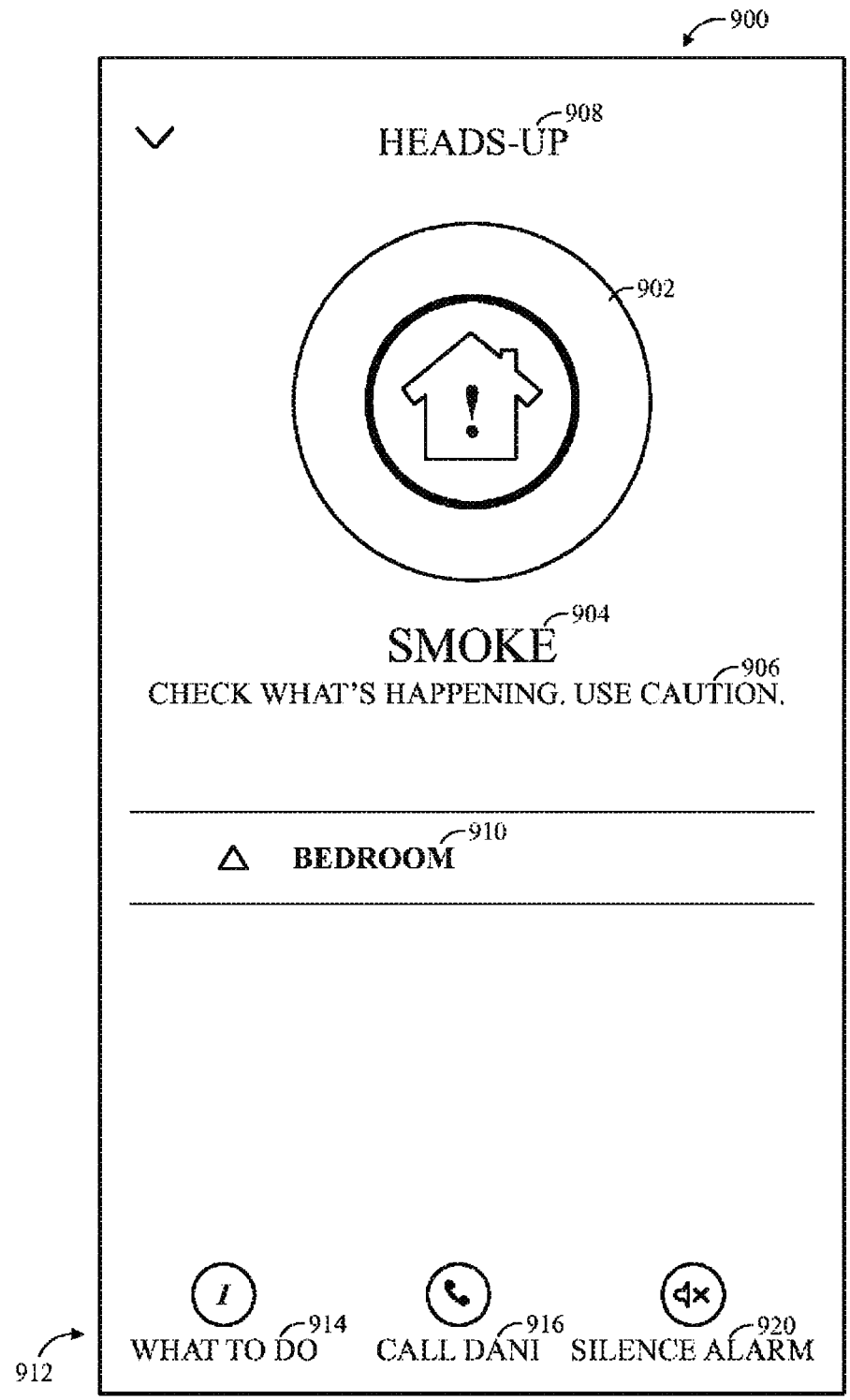
FIG. 30 illustrates an alert screen used in the process of FIG. 29, according to an embodiment.

For example, in some embodiments, the electronic device 804 may display an alert screen 900, as illustrated in FIG. 30. The alert screen 900 includes an icon 902 intended to draw attention to the screen 900. In some embodiments, the icon 90 includes a flashing ring that has been changed to a color to indicate a level of alarm severity. Furthermore, the electronic device 804 may vibrate or emit sound to draw attention to the alert screen 900. The alert screen 900 also includes an alarm type 904 that indicates the type of critical event detected by the smart device 800. The alert screen 900 may also include additional information 906 about the critical event or what actions to take in response to the alarm. The alert screen 900 also indicates an alarm severity 908. For example, the alert screen 900 may distinguish between one or more heads-up states and one or more alarming level states. The alert screen 900 also indicates a location 910 for the smart device 800 detecting the critical event. The alert screen 900 also includes an actions bar 912 that provides shortcuts to various actions that may be expected in response to the alarm. The actions bar 912 includes a tips button 914 that when selected provides more information regarding the critical event and what actions to take in response. The actions bar 912 also includes a call button 916 that, upon selection, causes the electronic device 804 to call or send a message to a pre-designated contact. The actions bar 912 also includes a silence alarm button 920. However, as previously discussed, if the alarm is unhushable, the silence alarm button 920 may be omitted from the screen, and if proximity between the smart device 800 and the electronic device 804 cannot be confirmed, the silence alarm button 920 may be grayed-out or otherwise indicating that the devices should be moved closer together to conduct hush. In some embodiments, when a grayed-out silence alarm button 920 is selected, the electronic device 804 may present an explicit instruction to move the electronic device 804 closer to the smart device 800. In some embodiments, a color of the alert screen 900 may be varied to indicate receipt of an alarm. For example, an all-clear page may be a first color (e.g., white) and the alert screen 900 may have a different color (e.g., black or dark gray).

In some embodiments, multiple alarms may be presented using the alert screen 900. In such embodiments, the location 910 may include a location (e.g., living room, kitchen, garage, etc.) for each alarming device in the smart network. The icon 902 may correspond to the highest priority alarm between each of the devices. Thus, various alarm types may be prioritized in level of severity such that the highest severity alarm is presented at the top of the list in the location 910. For example, the alarms may be prioritized in descending order of severity: smoke alarm, carbon monoxide alarm, heads up smoke level notification, heads up carbon monoxide notification, and other heads up notifications.

Figure 31:
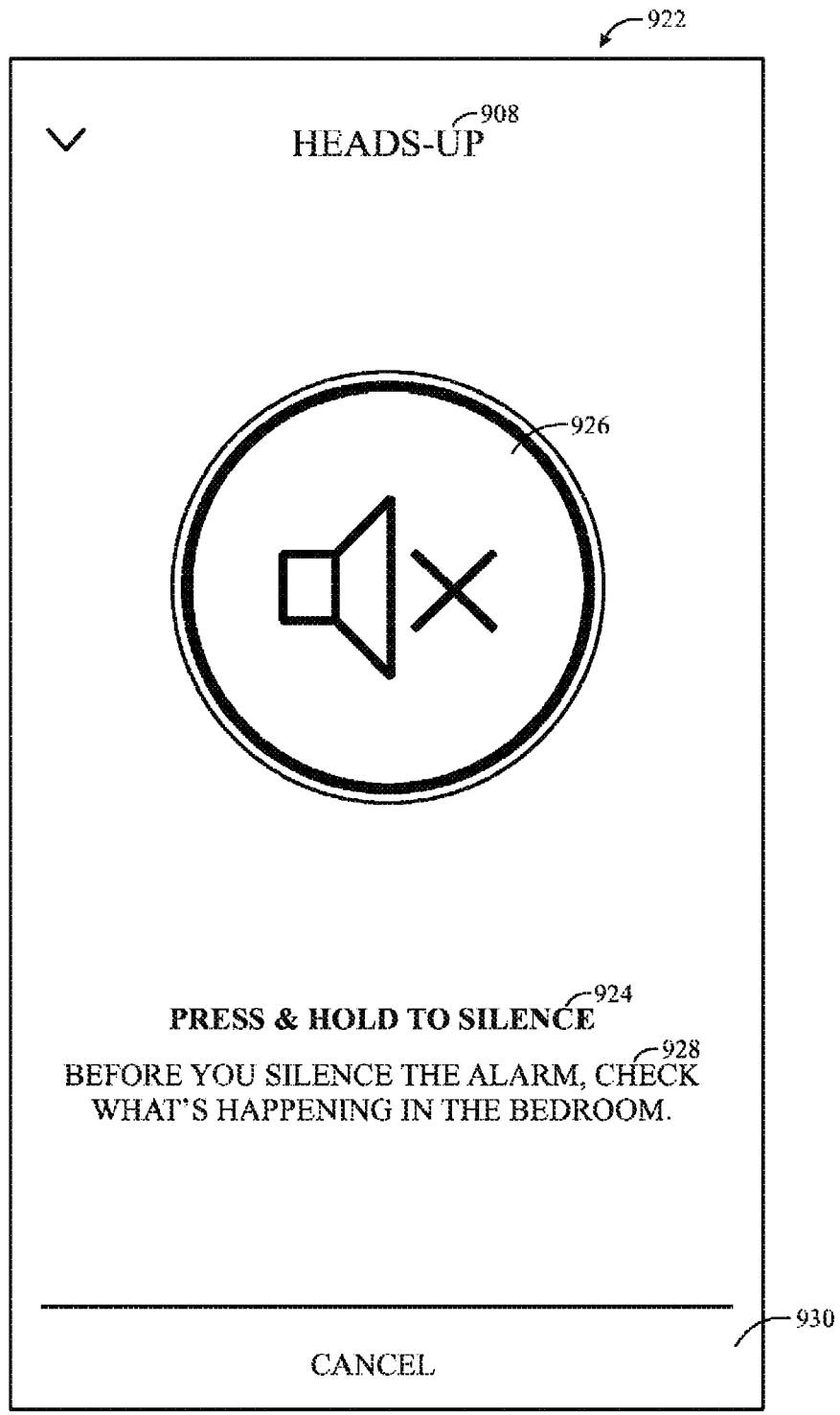
FIG. 31 illustrates a hush confirmation screen that may be used in the process of FIG. 29, according to an embodiment.

Returning to FIG. 29, when hushing the alarm, the electronic device 804 receives a selection of the hush option (block 838). Upon receipt of the selection of the hush, the electronic device may present a hush confirmation screen 922, as illustrated in FIG. 31. The hush confirmation screen 922 includes hushing instructions 924 that instruct a user how to confirm an intent to hush the alarm after the silence button 920 has been pressed. For example, the hushing instructions 924 instruct that hushing may be performed by pressing and holding a hushing button 926 to hush the alarm. In some embodiments, the hushing instructions 924 may give different instructions depending on a confirmation method, such confirming the hush with character entry, a biometric entry, a gesture, a button click, and/or another suitable input for confirming an intent to hush the alarm. For example, if the confirmation includes a gesture, the gesture may be a simple swipe in any direction, a compound gesture that includes multiple motions, a combination of a number of fingers and a related gesture, or some combination thereof. The confirmation screen 922 may also include additional instructions 928 regarding actions that might be taken in addition silencing the alarm, such as safety instructions related to the alarm type. For example, if a smoke alarm is occurring the additional instructions may include instructions to stay low during fire and check doors for heat before opening. The confirmation screen 922 also includes a cancel button 930 that provides a mechanism to indicate that hushing was accidental or is no longer desired.

Figure 32:
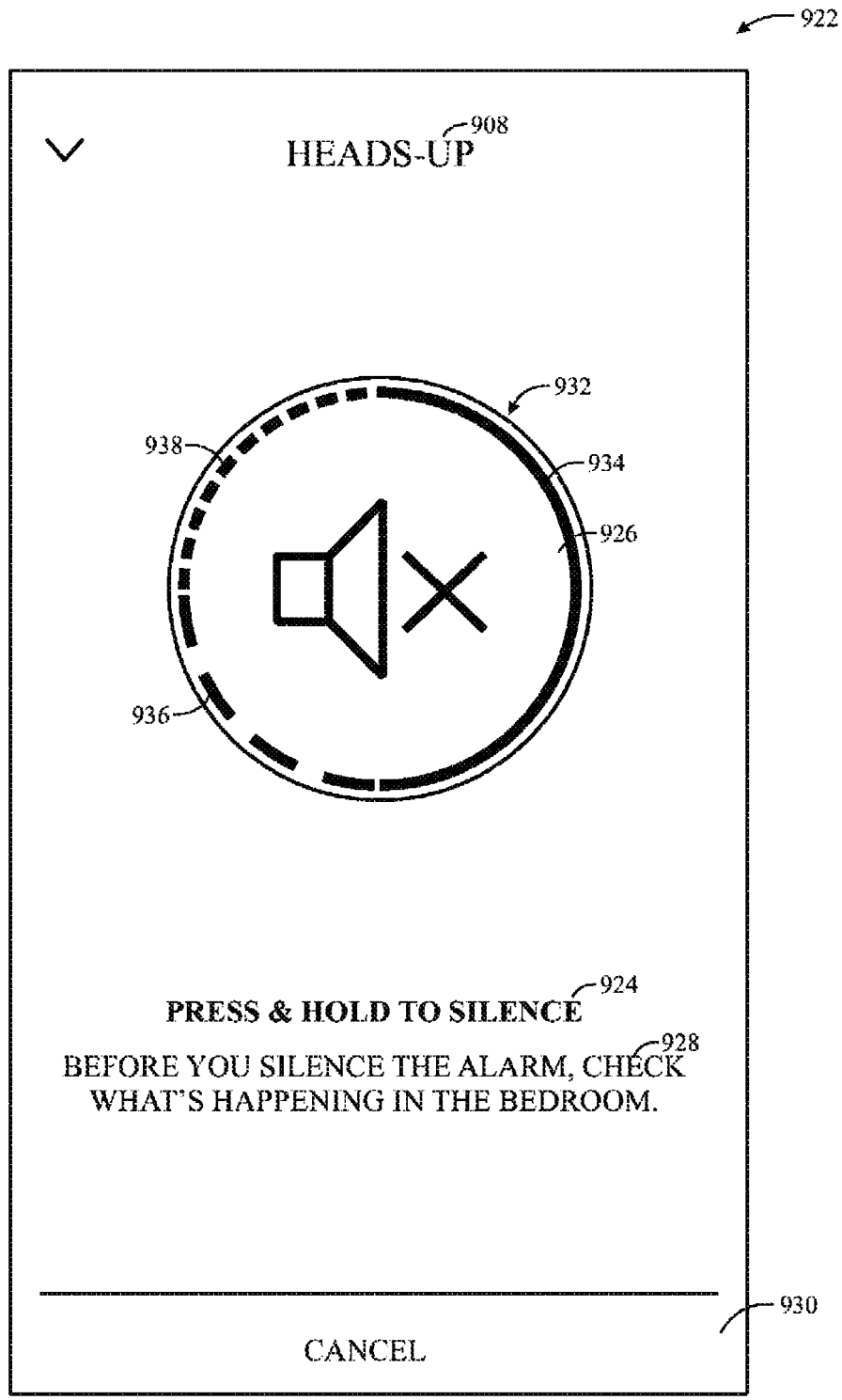
FIG. 32 illustrates the hush confirmation screen reflecting visual changes during the process of FIG. 29, according to an embodiment.
Figure 33:
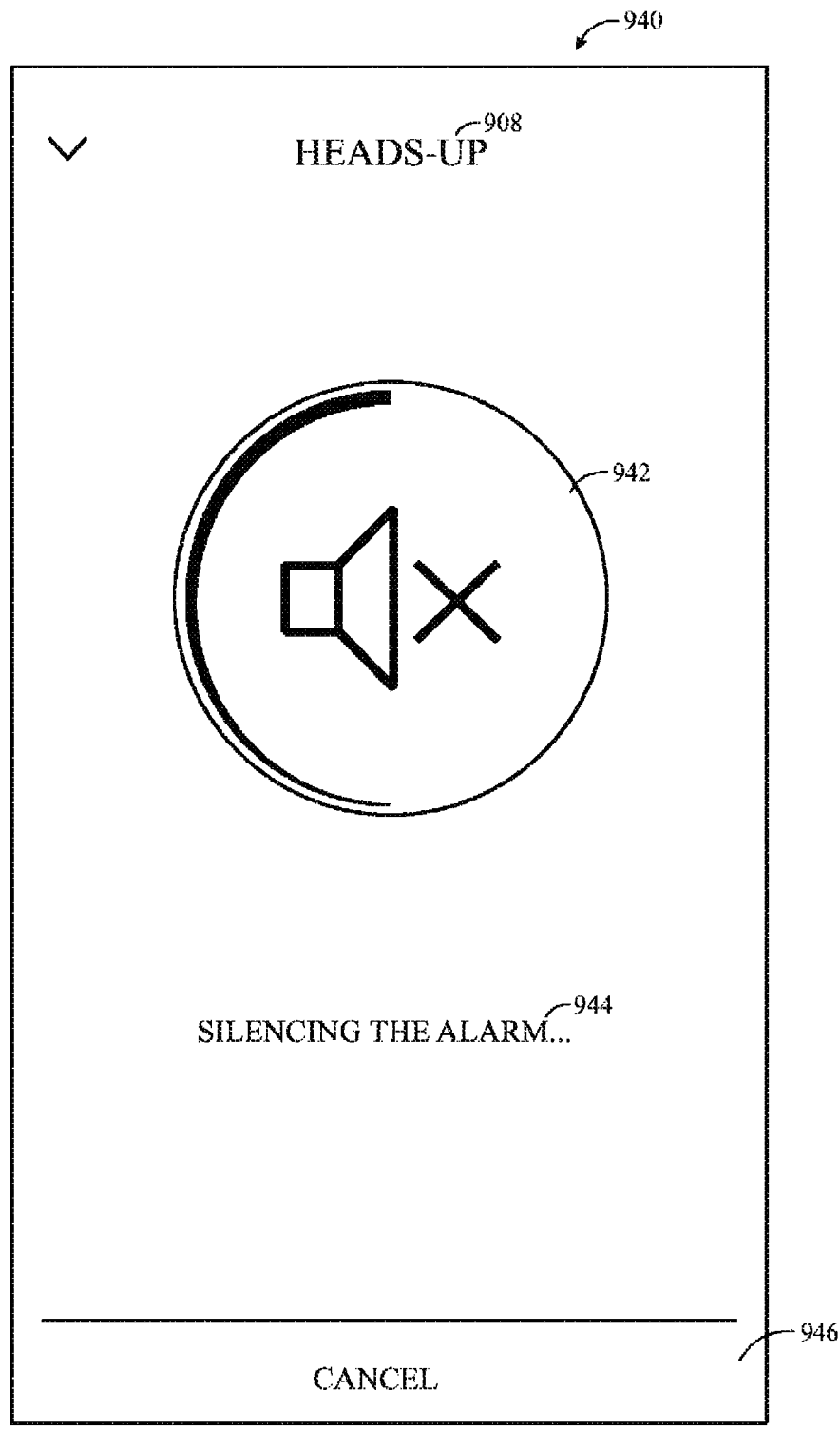
FIG. 33 illustrates a silencing screen that may be used in the process of FIG. 29, according to an embodiment.

FIG. 32 illustrates an embodiment of the confirmation screen 922 showing change in the hushing button 926 during a held button press. As illustrated, the hushing button 926 includes a ring 932 that changes color as the hushing button 926 is held. In other words, the ring 932 provides feedback regarding how long the hushing button 926 has been held and how much longer the hushing button 926 is to be held before the hush has been confirmed. In some embodiments, the ring 932 may be divided in a number (e.g., 2, 3, 4, 5, or more) arcs that change color as the hushing button 926 is held. For example, when there are 4 arcs and the hold duration is 2 seconds, each arc corresponds to a button hold of half a second. Furthermore, as illustrated, in some embodiments, the arcs may change gradually from a dark color to a light color. Thus, in the illustrated embodiment, the ring 932 includes two lighter color or brightness arcs 934, an intermediate color or brightness arc 936, and a darker color or brightness arc 938. According to the current embodiment, the hushing button 926 has been held between 50% to 75% of a hush confirmation duration. Once the button press has been confirmed, the electronic device 804 may present a silencing screen, such as the silencing screen 940 illustrated in FIG. 33. The silencing screen 940 includes a visual hushing indicator 942 that a hush attempt is ongoing. For example, the visual hushing indicator 942 includes a rotating ring indicating that the hushing attempt is ongoing. In some embodiments, the silencing screen 940 includes a textual indicator 944 that indicates that the hushing attempt is ongoing. In some embodiments, the textual indicator 944 and/or the visual hushing indicator 942 may include a countdown reflecting an amount of time before the electronic device 804 times out the hush attempt. The silencing screen 940 also includes a cancel button 946 that provides a mechanism to indicate that hushing was accidental or is no longer desired.

Returning to FIG. 29, once the hush has been confirmed, the electronic device 804 establishes a connection to the smart device 800 based on the wireless signal receives from the smart device 800 (block 840). In embodiments, where the smart device 800 indicates the critical event to the electronic device 804 using a BLE advertisement, the electronic device 804 established a BLE pairing with the smart device 800 using the BLE advertisement.

Via the wireless connection, the electronic device 804 sends a hush request to the alarming smart device 800 (block 842). In some embodiments, sending the hush request also includes a proximity verification and an authentication verification. Specifically, as previously discussed, the smart device 800 receives a challenge code as part of the received indication of the critical state. Using a pre-shared key retrieved from the service 810, the electronic device 804 creates a hush signature signs the challenge code using pre-shared key. Since both the electronic device 804 and the smart device 800 generate the hush signature, the smart device 800 can verify the hush signature and use it to authenticate the electronic device 804 and verify proximity of the electronic device 804 before approving the hush request.

The electronic device 804 then receives a response from the smart device 800 indicating a status of the hush attempt (block 844). The electronic device 804 then determines whether the alarm was hushed (block 846). If the alarm was hushed, the electronic device 804 may display the hush result (block 848).

Figure 34:
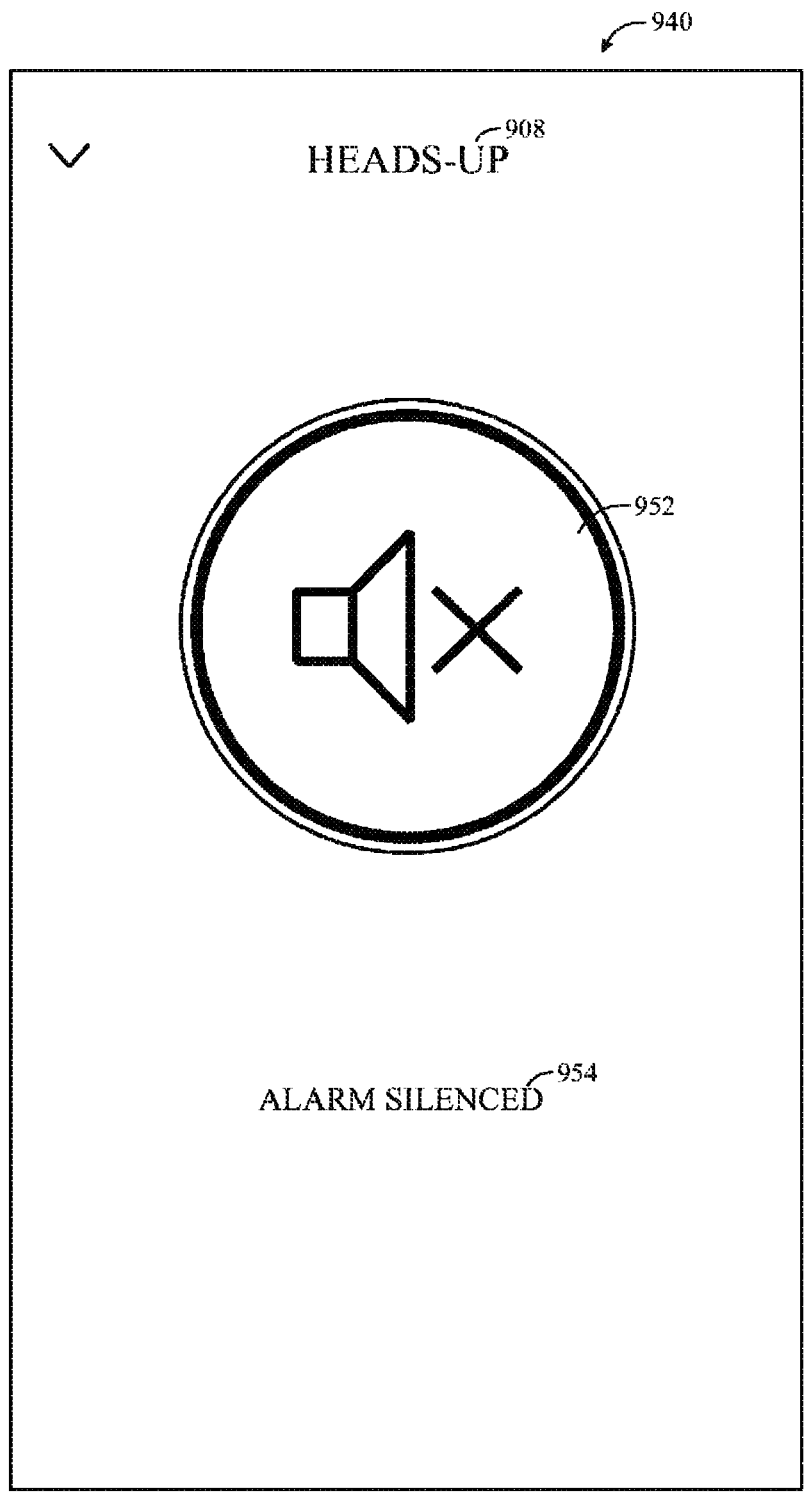
FIG. 34 illustrates a result screen that may be used to indicate success or failure during the process of FIG. 29, according to an embodiment.

FIG. 34 illustrates an example result screen 950 that may be used to indicate success or failure of the hush request. In the illustrated embodiment, the result screen 950 indicates a successful hush as indicated by a hush status indicator 952 and textual hush status indicator 954. In embodiments, where the hush is not successful, the result screen 950 may indicate that the hush has not occurred using the hush status indicator 952 with the "x" omitted. Similarly, the textual hush status indicator 954 may recite "Alarm not silenced." In some embodiments, the result screen 950 may include additional text that notes what may happen next, such as listing a period of time after which the hush will end and the alarm will restart if the critical event has not ended.

Returning to FIG. 29, if the hush has not been completed successfully, the electronic device 804 return to block 828 to reattempt the hush. In some embodiments, the alarm may be marked as unhushable when a hush attempt is unsuccessful or the alarm exceeds a hushable threshold. For example, high smoke levels may cause an alarm to be unhushable. Thus, in some embodiments, various smoke level thresholds may be used by the smart device: a relatively low monitoring/holding level that increases sampling periods to track the smoke level more closely, one or more higher heads-up smoke levels that cause a relatively priority level alarm, a higher smoke level that causes a higher priority alarm, and an even higher smoke level that causes the alarm to become unhushable. Although the foregoing example relates to smoke levels, the smart device 800 may have escalating levels of reactions to various levels of any measurement that the smart device 800 makes.

Figure 35:
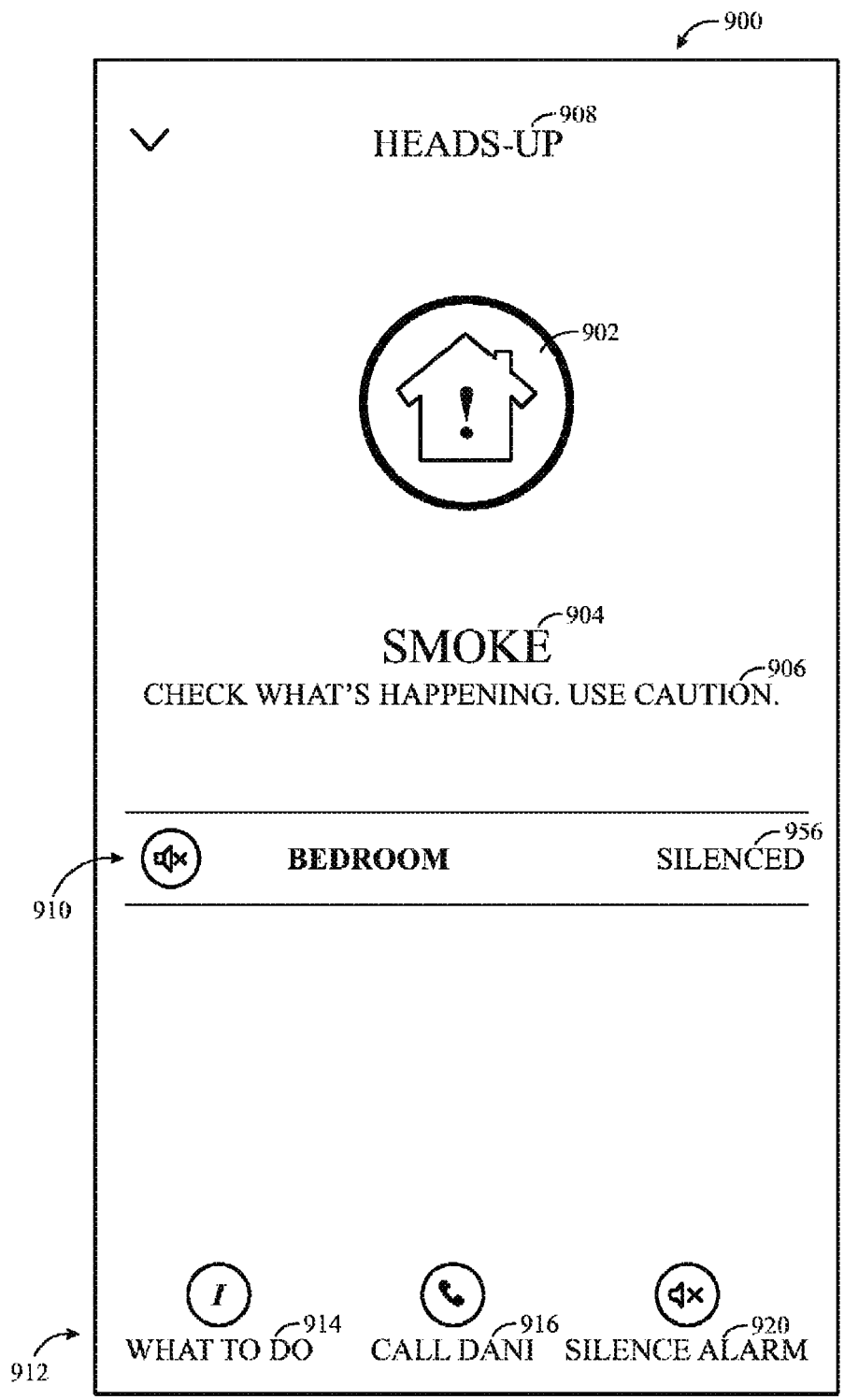
FIG. 35 illustrates an updated alert screen of FIG. 30 after a hush has been performed, according to an embodiment.

If the hush has been completed successfully, the electronic device 804 closes the connection to the smart device 800 if not already closed by the smart device (block 850). By closing a BLE connection, the smart device 800 may restart advertisements with an updated alarm status, such as hushed or non-alarming. The electronic device 804 then receives the updated alarm state (block 852). In some embodiments, based on the updated advertisement, the electronic device may update an alert an alert screen 900 as illustrated in FIG. 35. For example, after receiving an indication that the alarm has been hushed, the alert screen 900 may have the silence alarm button 920 grayed-out, and the location 910 may be appended with a status 956 of the alarm showing success or failure of the hush.

Figure 36:
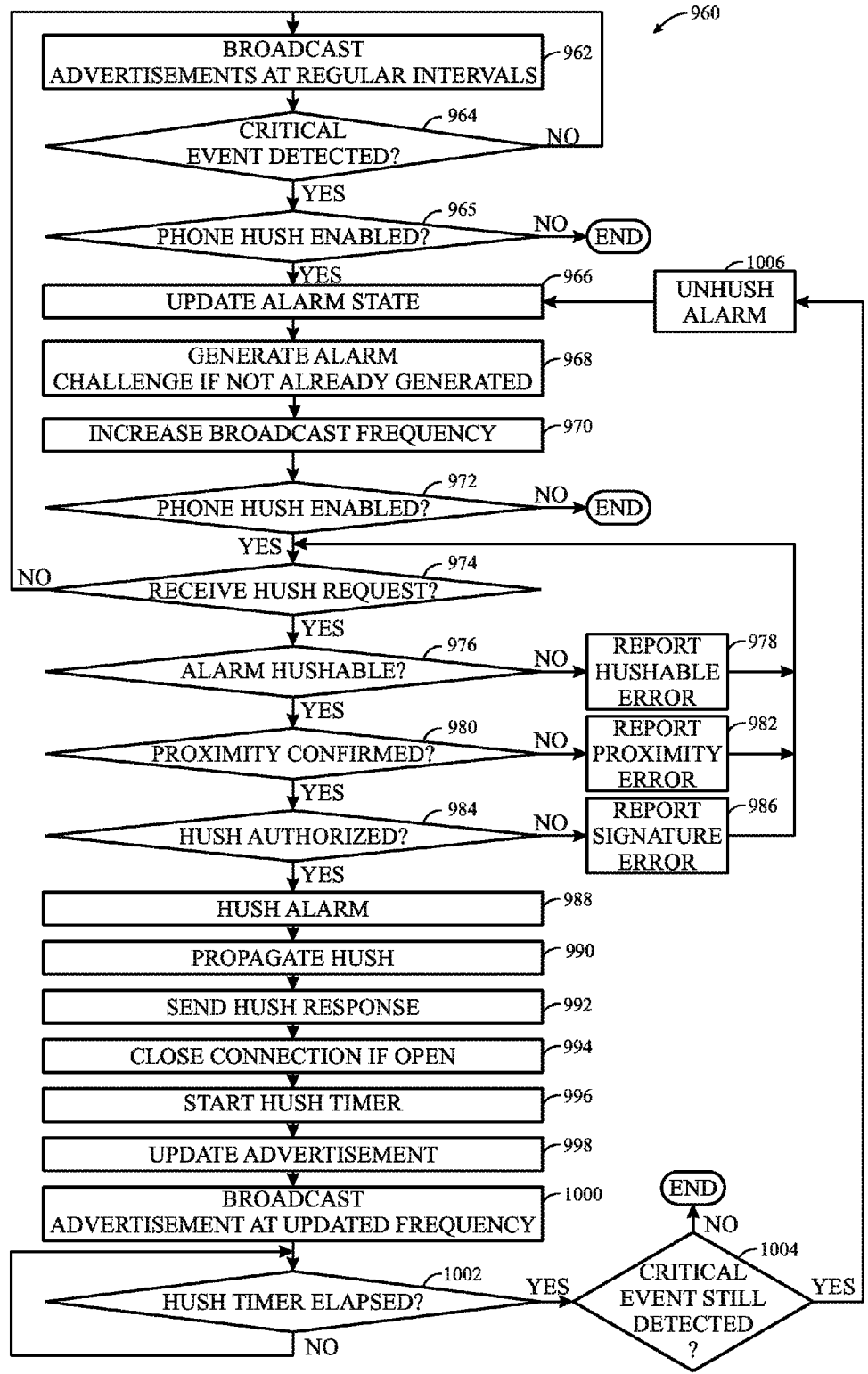
FIG. 36 illustrates a process for hushing and propagating alarms, according to an embodiment.

FIG. 36 illustrates a process 960 that may be performed by the smart device 800. During operation of the smart device 800, the smart device 800 broadcast an advertisement for a wireless connection at a regular interval (block 962). For example, the smart device 800 may broadcast an advertisement for BLE, WiFi, and/or some other network protocol. Moreover, the smart device 800 may intermittently broadcast this message at regular intervals based on an alarm state. For example, if the alarm state is idle (i.e., not actively alarming), the smart device may broadcast the advertisement at a default rate (e.g., once every half second); if the alarm state is in an alarm state, the smart device 800 may broadcast at an alarm rate (e.g., once every 40 ms); and if the alarm state is hushed, the smart device 800 may broadcast a related advertisement at a hushed rate higher than the default rate but lower than the alarm rate (e.g., once every quarter second). In some embodiments, the hushed rate may be the same as the default rate. In other words, an advertisement corresponding to a hushed state would be sent as frequently as an advertisement corresponding to a non-alarming state.

As part of the smart device 800 functionality, the smart device 800 determines whether a critical event has occurred (block 964). If a critical event has not occurred, the smart device 800 continues to scan for such events while continuing to broadcast an advertisement for a connection. If a critical event is detected, the smart device 800 also determines whether hush is enabled for the smart device 800 (block 965). In some embodiments, hushing may be generally disabled or enabled for the smart device 800 via a user interface on the smart device, via a user interface as a general rule based on a device type of the device, based on a location of the device, or some combination thereof. In certain embodiments, the smart device 800 may indicate that hushes are disabled for the smart device 800 (thereby causing the electronic device 804 to disable and/or hide hushing in a user interface (e.g., alert screen 900) that displays a notification of detection of the critical event. If hushing is not enabled for the smart device 800, the hushing process 960 is ended for this alarm, but the hushing process 960 may restart at block 964 upon detection of a new critical event or when the smart device 800 becomes hushable.

If hushing is enabled for the smart device 800, the smart device 800 updates its alarm state to the alarming state (block 966). As part of updating to the alarming state, the smart device 800 updates its advertisement to include the previously discussed critical event service UUID 708 and other parts of the critical event data chunk 702 along with appropriate values for fields associated therewith, such as alarm type and severity. Updating the alarm state may also include broadcasting an audible or visual signal to indicate the critical event to an area around the smart device 800. For example, the smart device 800 may periodically buzz a buzzer and/or play audio messages indicating the nature of the critical event.

Also, if the smart device 800 has not already generated an alarm challenge for this occurrence of the critical event, the smart device 800 generates the challenge code 716 to be used to ensure timeliness of any hushing requests (block 968). As previously discussed, the alarm challenge 716 may include a randomly generated value generated at or near the time of detection of the critical event that is used to authenticate that a hush request received in response to the critical event is sent closely in-time to the detection of the critical event.

Using an updated advertisement that includes the updated alarm state and the newly included critical state data chunk 702, the smart device 800 broadcasts the updated advertisement at the alarm rate (block 970). The smart device 800 then waits for a hush request to be received (block 974). Once a hush request is received, the smart device 800 determines whether the alarm is hushable (block 976). In some embodiments, hushing for a specific alarm may be disabled or enabled based on a type of alarm, severity of the alarm, previous hushing of the alarm, or some combination thereof. If In certain embodiments, the smart device 800 may indicate that hushes are disabled for the smart device 800 (thereby causing the electronic device 804 to disable and/or hide hushing in a user interface (e.g., alert screen 900) that displays a notification of detection of the critical event. In some embodiments, if hushing is not enabled for the alarm, the smart device 800 sends the electronic device 804 a response that reports an error hushing the alarm, because the alarm is not hushable (block 978). In some embodiments, if hushing is not enabled for the alarm, the hushing process 960 is ended for this alarm, but the hushing process 960 may restart at block 964 upon detection of a new critical event or when the alarm becomes hushable. For example, if the alarm severity decreases, the alarm may become hushable.

If the smart device 800 has hushes enabled and the alarm is hushable, the smart device 800 also determines whether the smart device 800 is within a threshold distance of the smart device 800 (block 980). For example, the smart device 800 may determine that the smart device 800 is within the threshold distance when the hush request is received over BLE or another wireless connection protocol with a known range. Additionally or alternatively, the smart device may broadcast an sonic (e.g., ultrasound) or visual (e.g., infrared) signal that the electronic device 804 includes in the hush request that the smart device 800 can use to determine that the electronic device 804 is within the threshold distance (e.g., sonic or visual range) of the smart device 800. Additionally or alternatively, in some embodiments, proximity may be determined using strength of signal levels for wireless communications, geospatial tracking (e.g., global positioning system location), detections of various electromagnetic fields (e.g., RFID, NFC), or other methods that may be used to ensure that alarms are disabled from a location where the critical event may have been monitored.

If the electronic device 804 is determined to be within range of the smart device 800, the smart device 800 also determines whether the hush is authorized (block 984). In some embodiments, the proximity verification and authorization verification may be combined into a single step. For example, as previously discussed, the hush request includes a hush signature that is generated using the challenge code 716 and a pre-shared key that the smart device 800 and the electronic device 804 that has been shared through the remote service. The smart device 800 and the electronic device 804 each have access to the challenge code 716 and the pre-shared key, and each generates the signature. In some embodiments, the smart device 804 may determine that the signature contains proper encryption using the pre-shared key but the signature is not signed over the correct challenge code. For example, when the pre-shared key is used to generate a signature that uses a null challenge code or an old challenge code, the smart device 800 may maintain copies of one or more old signatures generated using old challenge codes and a copy of a signature generated with a null code to use for comparison. When one of these signatures matches the hush signature received from the electronic device 804, the smart device 800 may respond with the proximity not authorized error. When the signature does not match any expected signatures, the smart device 800 responds to the electronic device 804 with a signature error (block 986). In some embodiments, the smart device 800 may wait for another hush response after sending the hushability error, the proximity error, or the signature error.

If the alarm is hushable and the signature is verified, the smart device 800 hushes the alarm (block 988). In some embodiments, smart device 800 is connected to other smart devices in the smart network and caused them to alarm when the critical event was detected. In such embodiments, when the smart device 800 hushes the alarm locally, the smart device 800 propagates the hush to other alarming devices 800 in the smart network (block 990). In certain embodiments, initiation of the hushing propagation is limited to devices that originated the alarm by detecting the critical event. Thus, in such embodiments, ensuring proximity verification of the electronic device 804 to the originating device ensures that a hush is requested when the totality of the situation causing the critical event may be inspected visually. Furthermore, as previously discussed, the smart device 800 includes at least two wireless interface protocols through which communications may be made. In some embodiments, as discussed below, the hush request may be received through a first wireless connection type (e.g., BLE), and the hush may be propagated through a second wireless connection type (e.g., 802.15.4).

In addition to propagating the hush, the smart device 800 sends a hush response that indicates that the hush has been successfully completed (block 992). In some embodiments, once the hush response has been sent, the smart device 800 closes a connection through which the hush request was received (block 994). In other words, in embodiments where the wireless connection between the electronic device 804 and the smart device 800 is a paired connection that ceases connection advertisements (e.g., BLE), the wireless connection is closed so that the smart device 800 can communicate its alarm states to more than a single device using connection advertisements as previously discussed. In certain embodiments, the connection may be closed by the smart device 800 and/or the electronic device 804 once the hush response is sent by the smart device 800 and/or received by the electronic device 804.

As part of the hush process, after receiving an authorized hush, the smart device 800 updates its advertisement packet to a hushed alarm advertisement (block 998). For instance, the critical service data chunk 702 is updated to indicate that the alarm indicated in the advertisement. The smart device 800 also changes the advertisement period from the alarm rate to the hushed rate, which, in some embodiments, is the same as the default rate (block 1002). The smart device 1002 continues to wait until the hush timer has elapsed (block 1000). In other words, the hush has a limited duration of efficacy (e.g., 1 minute) after which the hush stops. After the hush timer has elapsed, the smart device 800 determines whether the critical event is still detected (block 1004). If the critical event is no longer in effect, hushing process 960 has ended for this alarm, but the process may begin again when another critical event is detected. Although the hushing process 960 has ended for the current alarm, there may be other active alarms with the smart device 800 currently alarming. If the critical event is in still in effect, the smart device 800 unhushes the alarm (block 1006). In some embodiments, unhushing the alarm may also include indicating that the alarm is now unhushable. In other words, in such embodiments, each alarm may be hushed only once. In certain embodiments, the smart device 800 may keep a hush counter for each alarm and set the alarm as unhushable when the hush counter has surpassed a hush limit threshold.

Figure 37:
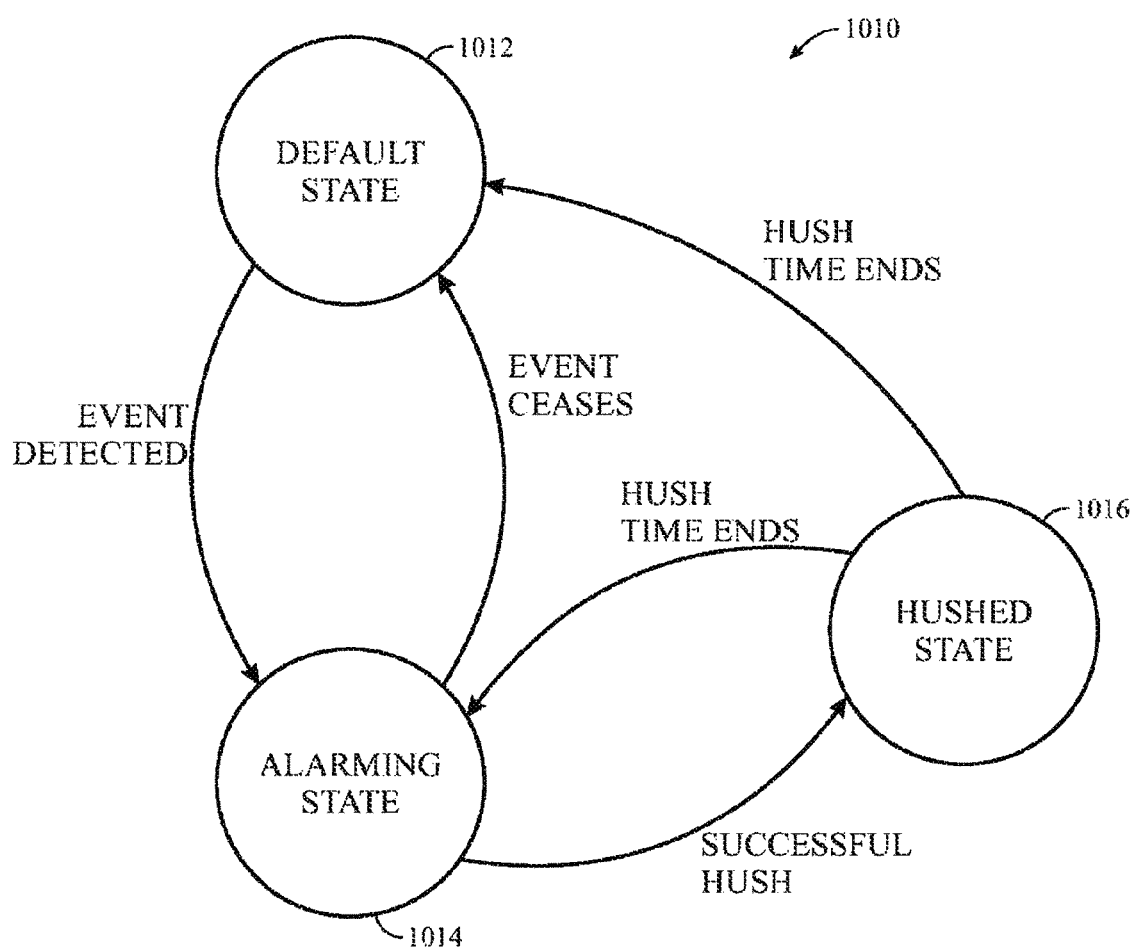
FIG. 37 illustrates a state machine for an alarm state for a smart device, according to an embodiment.

FIG. 37 illustrates a state machine 1010 that may be used to determine a current state for the smart device 800. As previously discussed, during the default state, smart device 800 may broadcast a wireless communications type (e.g., BLE) advertisement that gives general information about the smart device 800 at a default rate. In some embodiments, the smart device 800 blocks wireless connections through the wireless communication type. The smart device 800 starts in a default state 1012. When an event is detected, the smart device transitions to an alarming state 1014. As previously discussed, when the smart device 800 is in the alarming state 1014, the smart device 800 broadcasts an advertisement over the wireless communications type that includes alarm information (e.g., critical event UUID, etc.) at a higher rate than the advertisement frequency in the default state 1012. Furthermore, in the alarming state 1014, the smart device 800 may allow connections via the wireless communications type to receive hush requests. In some embodiments, the smart device 800 may also broadcast notifications of the alarm to other devices in the smart network using a propagation communications type (e.g., 802.15.4). From the alarming state 1014, if the event cease, the smart device 800 transitions back to the default state 1012.

In some embodiments, the smart device 800 transitions through intermediate states, such a holding or monitoring state during which the smart device 800 determines whether the event is ongoing. A holding state may include a pre-alarm state used to sample data at a faster rate when a measurement approaches alarm thresholds (e.g., alarm threshold or heads-up threshold) to enable the smart device 800 to determine whether an alarming event has occurred. A monitoring state may include a post-alarm state used to sample data at a faster rate as the measurement is elevated but below the alarm thresholds. If the smart device determines that the event is still ongoing, the smart device 800 returns from holding or monitoring state and/or stays in the alarming state 1014. While in the alarming state 1014, the smart device 800 may receive a valid hush request. If the alarm is unhushable, the smart device 800 remains in the alarming state 1014, but the smart device 800 may still propagate the hush to other devices in the smart network via the propagation communications type. For example, in some embodiments, the smart device 800 may receive a hush request via BLE and propagate the hush to other devices in the smart network via an 802.15.4 network connection and/or an 802.11 network connection even when the alarm may not be hushed at the smart device 800. When the alarm is hushable a valid hush is received, the smart device 800 may hush the alarm and transition to a hushed state 1016.

In the hushed state 1016, the smart device 800 broadcasts a connection for wireless communications type with an indication that the alarm is current but hushed. In some embodiments, the advertisement broadcast frequency in the hushed state is less frequent than the advertisement broadcast frequency of the alarming state 1014. In certain embodiments, the advertisement broadcast frequency of the hushed state 1016 is as frequent as or more frequent than the default state 1012. As previously discussed, in some embodiments, the smart device 800 only stays within the hushed state 1016 for a limited period of time. In some embodiments, when the hushed period ends, if the critical event still exists, the smart device 800 returns to the alarming state 1014. Otherwise, the smart device 800 returns to the default state. In some embodiments, the smart device passes through a holding state before returning to the default state 1012. Additionally or alternatively, in certain embodiments, the smart device 800 returns to the default state 1012 before determining whether the critical event exists. In such embodiments, when the critical event remains, the smart device 800 transitions from the default state 1012 to the alarming state 1014.

The invention claimed is:

1. A non-transitory, tangible, and computer-readable medium storing instructions that, when executed by one or more processors of an electronic device, are configured to cause the electronic device to:
receive an indication of an alarm event occurring at a remote device;
determine whether the electronic device is within a proximity threshold of the remote device;
present a visual indicator of the alarm event, wherein the visual indicator comprises a hush option to alter an audible and/or visual alarm notification of the remote device when it is determined that the electronic device is within the proximity threshold of the remote device;
suppress the hush option from the visual indicator of the alarm event when it is determined that the electronic device is not within the proximity threshold of the remote device;
when the hush option is not suppressed, receive a user selection of the hush option; and
in response to the received user selection of the hush option:
communicate, from the electronic device to the remote device via a point-to-point wireless connection between the electronic device and the remote device, a hush request requesting that the remote device alter its audible and/or visual alarm notification; and
adjust the visual indicator to reflect a status of the hush request.

2. The non-transitory, tangible, and computer readable medium of claim 1, wherein the visual indicator comprises a circular shape or a rounded shape.

3. The non-transitory, tangible, and computer readable medium of claim 1, wherein to adjust the visual indicator comprises changing an appearance on a portion of a perimeter of the visual indicator corresponding to a status of the hush request, and wherein the appearance includes a color, or a degree of continuity of the perimeter, or a combination thereof.

4. The non-transitory, tangible, and computer readable medium of claim 1, wherein:
the point-to-point wireless connection comprises a Bluetooth Low Energy (BLE) connection type; and
the instructions, when executed by the one or more processors, are configured to cause the electronic device to transmit an advertisement for a BLE pairing to connect to the remote device.

5. The non-transitory, tangible, and computer readable medium of claim 1, wherein to suppress the hush option comprises to:
grey out a button corresponding to the hush option in the visual indicator of the alarm event;
prevent display of the button corresponding to the hush option in the visual indicator of the alarm event; or
present an error after the button corresponding to the hush option in the visual indicator of the alarm event has been selected.

6. The non-transitory, tangible, and computer readable medium of claim 1, wherein the instructions, when executed by the one or more processors, are configured to cause a display to present instructions to move closer to the remote device before attempting to hush the alarm event if an advertisement packet is not received within the proximity threshold.

7. The non-transitory, tangible, and computer readable medium of claim 1, wherein the instructions, when executed by the one or more processors, are configured to cause a display of instructions to go to a specific location where the alarm event has been detected.

8. The non-transitory, tangible, and computer readable medium of claim 1, wherein the instructions, when executed by the one or more processors, are configured to send the hush request to the remote device with a key to authenticate the hush request to the remote device if within the proximity threshold.

9. The non-transitory, tangible, and computer readable medium of claim 1, wherein the instructions, when executed by the one or more processors, are configured to cause the electronic device to:
receive an alarm challenge configured to verify that an advertisement is received within a proximity threshold of the remote device; and
include the alarm challenge in the hush request to verify proximity.

10. The non-transitory, tangible, and computer readable medium of claim 9, wherein the received alarm challenge comprises receiving a sonic signal or a visual signal.

11. The non-transitory, tangible, and computer readable medium of claim 9, wherein the instructions, when executed by the one or more processors, are configured to cause the electronic device to:

generate a signature by signing the alarm challenge using a key; and include the signature in the hush request to verify the proximity.

12. An electronic device comprising:

one or more processors; and memory storing instructions that, when executed by the one or more processors, are configured to cause the electronic device to:

receive an indication of an alarm event occurring at a remote device;

determine whether the electronic device is within a proximity threshold of the remote device;

present a visual indicator of the alarm event, wherein the visual indicator comprises a hush option to alter an audible and/or visual alarm notification of the remote device when it is determined that the electronic device is within the proximity threshold of the remote device;

suppress the hush option from the visual indicator of the alarm event when it is determined that the electronic device is not within the proximity threshold of the remote device;

when the hush option is not suppressed, receive a user selection of the hush option; and in response to the received user selection of the hush option:

communicate, from the electronic device to the remote device via a point-to-point wireless connection between the electronic device and the remote device, a hush request requesting that the remote device alter its audible and/or visual alarm notification; and adjust the visual indicator to reflect a status of the hush request.

13. The electronic device of claim 12, wherein the instructions are configured to cause the electronic device to receive a hush response from the remote device indicating whether the remote device has altered its audible and/or visual alarm notification.

14. The electronic device of claim 13, wherein the instructions are configured to cause the electronic device to:

determine from the hush response whether the remote device has altered its audible and/or visual alarm notification; and if the hush response indicates that the remote device has altered its audible and/or visual alarm notification, close the point-to-point wireless connection to the remote device.

15. The electronic device of claim 13, wherein the instructions are configured to cause the electronic device to:

if the hush response indicates that the remote device has altered its audible and/or visual alarm notification, indicate via the display that the remote device has altered its audible and/or visual alarm notification; and if the hush response indicates that the remote device has not altered is audible and/or visual alarm notifications, indicate via the display that the alarm event has not been hushed.

16. A method for hushing an alarm comprising:

receiving an indication of an alarm event occurring at a remote device;

determining whether the electronic device is within a proximity threshold of the remote device;

presenting a visual indicator of the alarm event, wherein the visual indicator comprises a hush option to alter an audible and/or visual alarm notification of the remote device when it is determined that the electronic device is within the proximity threshold of the remote device;

suppressing the hush option from the visual indicator of the alarm event when it is determined that the electronic device is not within the proximity threshold of the remote device;

when the hush option is not suppressed, receiving a user selection of the hush option; and in response to the receiving the user selection of the hush option:

communicating with the remote device via a point-to-point low power wireless connection, a hush request requesting that the remote device alter its audible and/or visual alarm notification; and adjusting the visual indicator to reflect a status of the hush request.

17. The method of claim 16, comprising, in response to the receiving the user selection:

requesting a hush confirmation as a button press confirmation, a gesture confirmation, an audio confirmation, or any combination thereof; and receiving the hush confirmation.

18. The method of claim 16, wherein the indication of the alarm event comprises an advertisement packet, and the method comprises receiving an additional advertisement packet for an additional point-to-point low power wireless connection from an additional remote device, wherein the additional advertisement packet for the additional wireless connection includes an indication of an additional alarm event occurring at the additional remote device.

19. The method of claim 18, comprising prioritizing the alarm event and the additional alarm event in a prioritized order based on severity of the alarm event and the severity of the additional alarm event, and presenting the visual indicator of the alarm event is arranged in relation to a visual indicator of the additional alarm event based on the prioritized order.

20. The non-transitory, tangible, and computer-readably medium of claim 1, wherein the indication of the alarm event comprises the advertisement packet.

* * * * *